United States Patent [19]

Suzuki

[11] Patent Number: 4,795,243
[45] Date of Patent: Jan. 3, 1989

[54] GRANULAR MEMBER MOVING METHOD AND APPARATUS

[75] Inventor: Masayuki Suzuki, Yokohama, Japan

[73] Assignee: Canon Kabushiki Kaisha, Tokyo, Japan

[21] Appl. No.: 616,182

[22] Filed: Jun. 1, 1984

[30] Foreign Application Priority Data

| Jun. 10, 1983 | [JP] | Japan | 58-103728 |
|---|---|---|---|
| Aug. 6, 1983 | [JP] | Japan | 58-144125 |
| Apr. 6, 1984 | [JP] | Japan | 59-67361 |
| Apr. 6, 1984 | [JP] | Japan | 59-67362 |
| Apr. 6, 1984 | [JP] | Japan | 59-67363 |
| Apr. 6, 1984 | [JP] | Japan | 59-67364 |
| Apr. 6, 1984 | [JP] | Japan | 59-67365 |
| Apr. 6, 1984 | [JP] | Japan | 59-67366 |
| Apr. 6, 1984 | [JP] | Japan | 59-67368 |
| Apr. 6, 1984 | [JP] | Japan | 59-67369 |
| Apr. 6, 1984 | [JP] | Japan | 59-67370 |
| Apr. 6, 1984 | [JP] | Japan | 59-67371 |
| Apr. 6, 1984 | [JP] | Japan | 59-67367 |

[51] Int. Cl.$^4$ .................................. G02F 1/01
[52] U.S. Cl. .................................. 350/362; 350/355; 350/359
[58] Field of Search .............. 40/406, 407; 350/359, 350/362, 363, 410, 312, 354, 355, 353, 359, 266; 340/763, 783, 788, 627; 358/236; 365/127, 129; 137/113; 210/176, 775

[56] References Cited

U.S. PATENT DOCUMENTS

| 2,089,484 | 8/1937 | Kleber | 350/269 |
|---|---|---|---|
| 3,341,274 | 9/1967 | Marks | 350/267 |
| 3,612,653 | 10/1971 | Rajchman | 350/363 |
| 3,767,392 | 11/1973 | Ota | 350/362 |
| 3,788,729 | 1/1974 | Lowell et al. | 350/362 |
| 4,126,854 | 11/1978 | Sheridan | 350/362 |
| 4,245,886 | 1/1981 | Kolodzey et al. | 350/267 |
| 4,408,831 | 10/1983 | Sakaguchi et al. | 350/269 |
| 4,417,786 | 11/1983 | Beni et al. | 350/362 |
| 4,536,061 | 8/1985 | Nishimura | 350/354 |

OTHER PUBLICATIONS

Cooper et al, "Pressure Generation Due to a Temperature Discontinuity at a Liquid-Liquid Plane Interface", Phys. Fluids 3-1978, pp. 334-346.
Levich, V. G., "Physicochemical Hydrodynamics", Chapt VII, pp. 384-390.
Sueramanian, R. S., "Slow Migration of a Gas Bubble in a Thermal Gradient", AICHE Jr., vol. 27, 190 4, 7-1981, pp. 646-654.
Wilcox et al, "Screening of Liquids for Thermocapillary Bubble Movement", AIAA Jr., vol. 17, #9, 9-1979, pp. 1022-1024.
Runyan, "Electrostatic Liquid Display Devices", IBM Tech. Disc. Bulletin, vol. 22, No. 1, Jun. 1979, p. 325.

Primary Examiner—John K. Corbin
Assistant Examiner—Martin Lerner
Attorney, Agent, or Firm—Fitzpatrick, Cella, Harper & Scinto

[57] ABSTRACT

A granular member is provided in a liquid layer. The granular member is formed of a substance which does not readily dissolve in the liquid, and the granular member is desirably formed by a bubble. A location in the liquid layer different from the location at which the granular member exists is heated to thereby form a temperature distribution in the liquid layer and move the granular member to the heated location.

21 Claims, 25 Drawing Sheets

FIG. 12
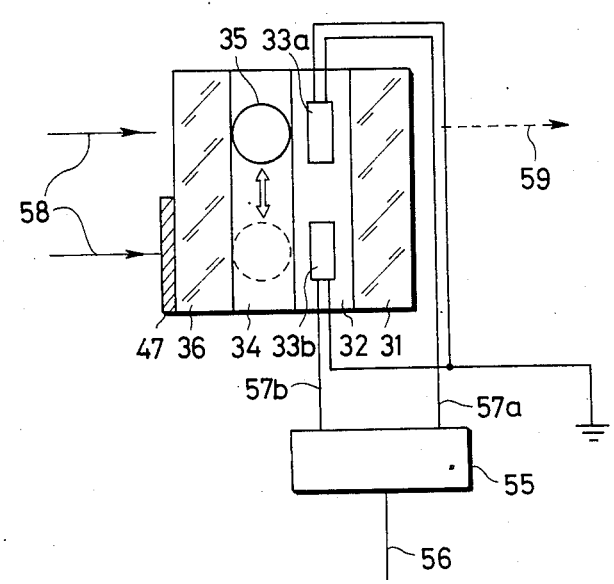
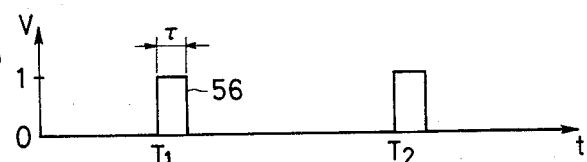
FIG.13A
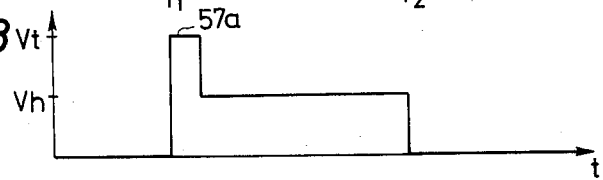
FIG.13B
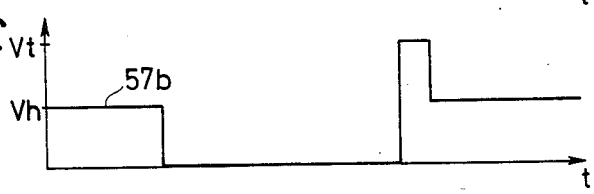
FIG.13C

FIG. 14
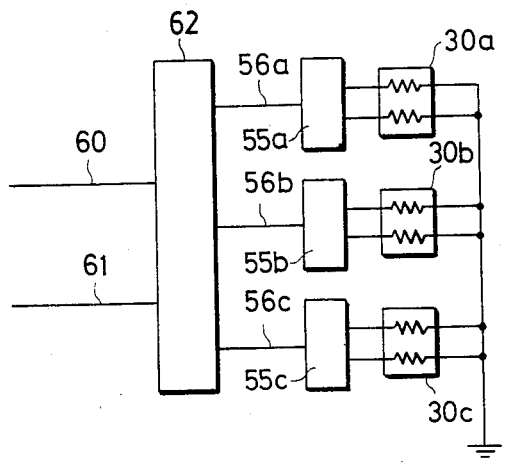
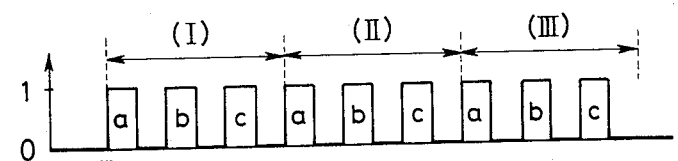
FIG.15A
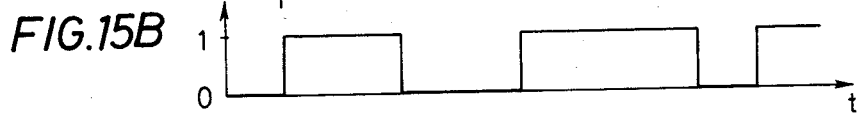
FIG.15B
FIG.15C
FIG.15D
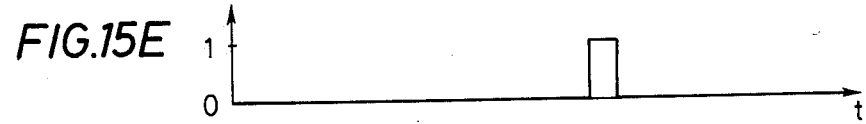
FIG.15E FIG. 16
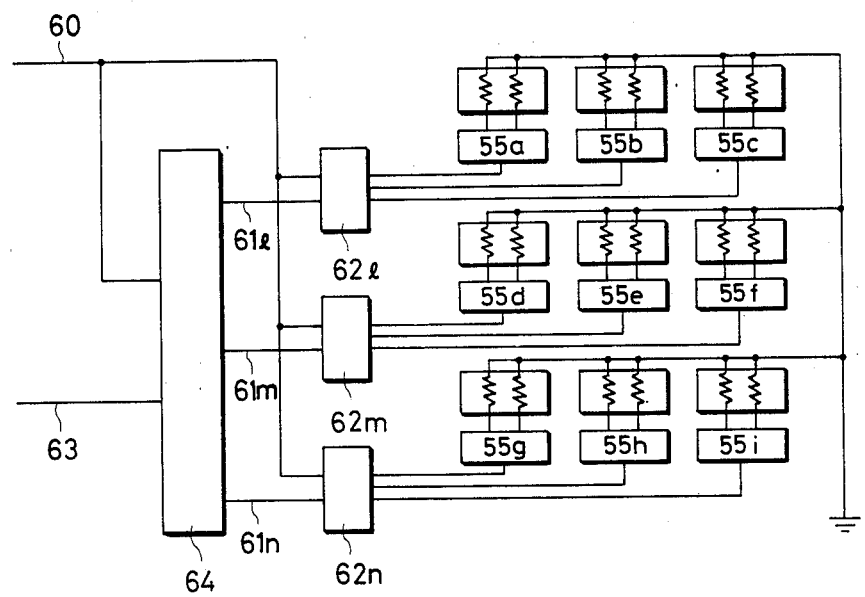
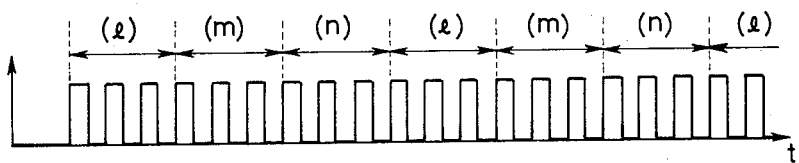
FIG.17A
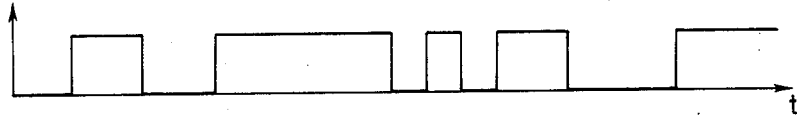
FIG.17B
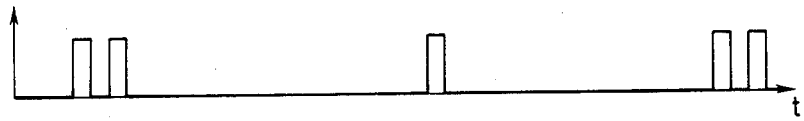
FIG.17C
FIG.17D
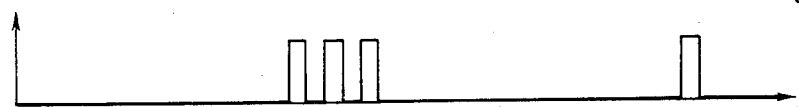
FIG.17E

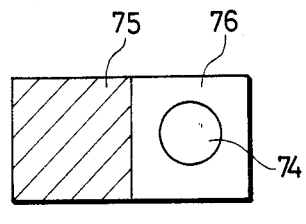
FIG.19A
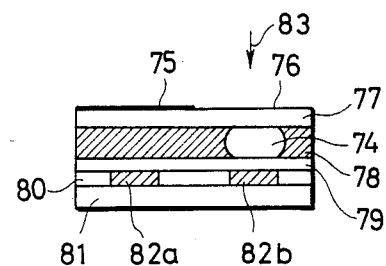
FIG.19B
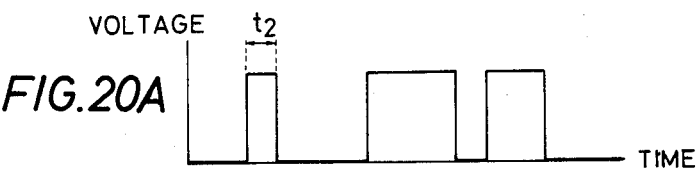
FIG.20A
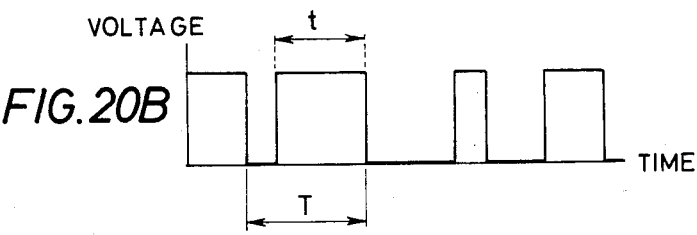
FIG.20B
FIG.21
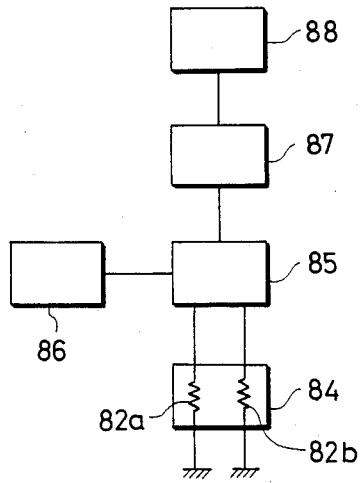

TIME

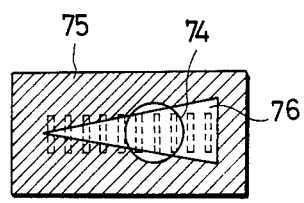
FIG. 24
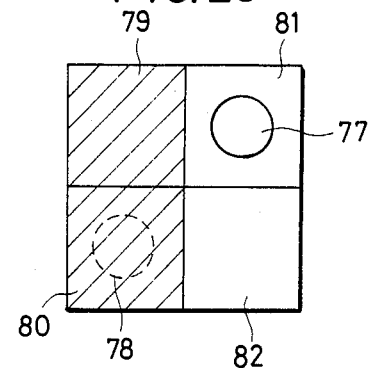
FIG. 25
FIG. 26
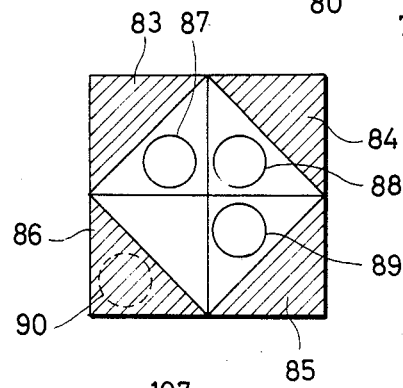
FIG. 27
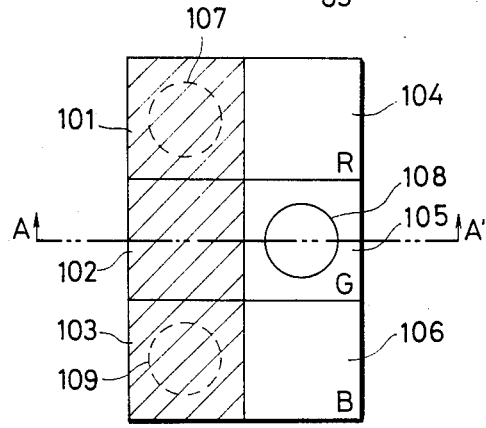
FIG. 28
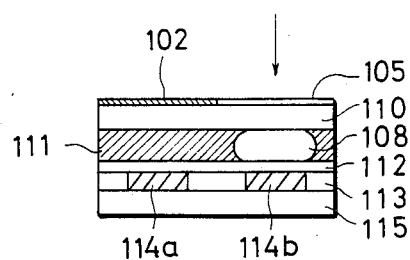

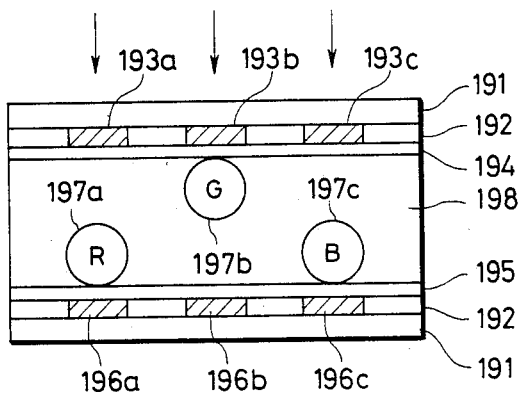
FIG.36
FIG.37A
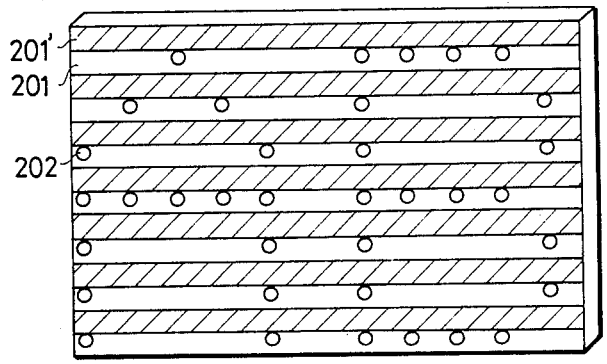
FIG.37B
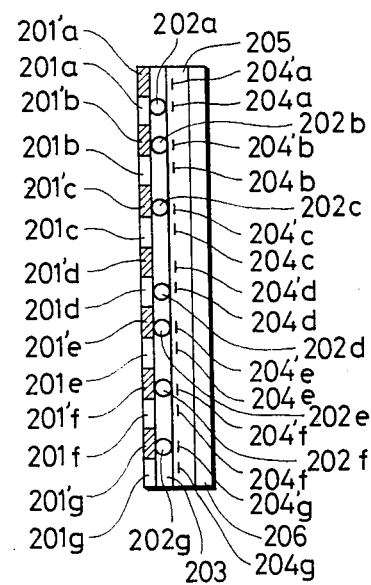

FIG.38A         FIG.38B
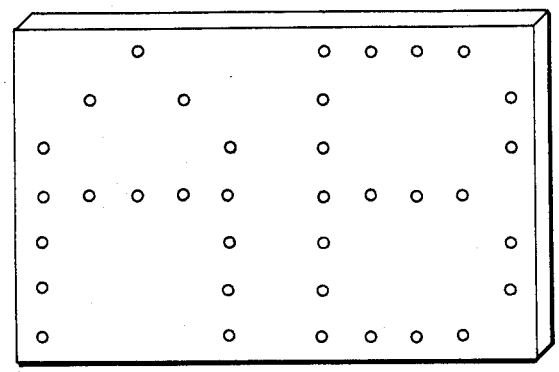
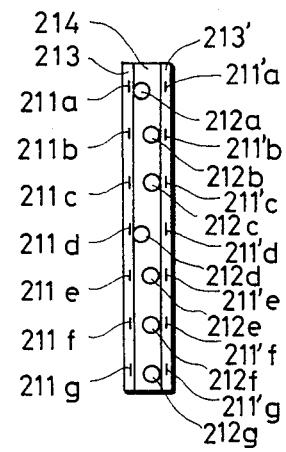
FIG.39A
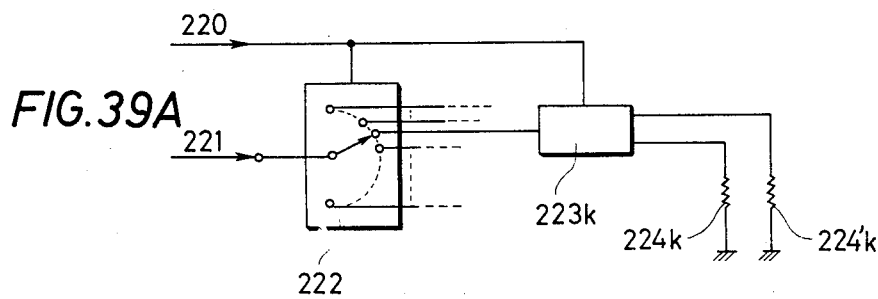
FIG.39B
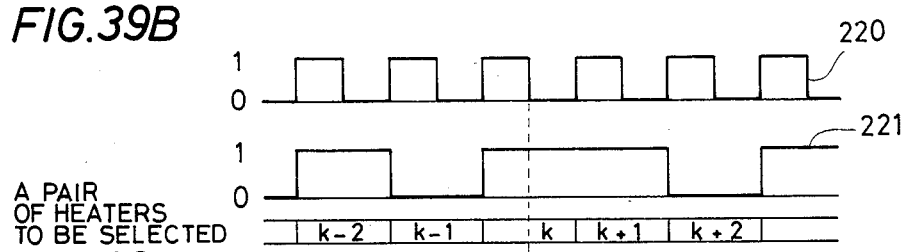
FIG.39C
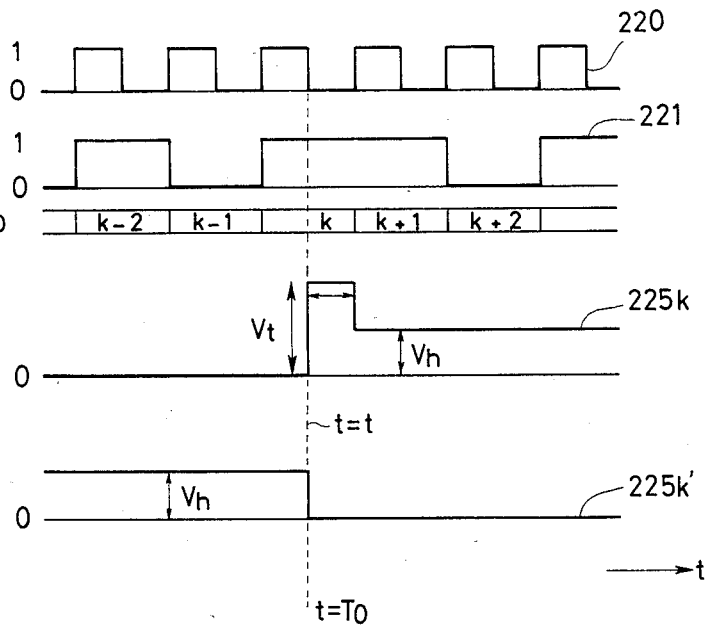

GRANULAR MEMBER MOVING METHOD AND APPARATUS

BACKGROUND OF THE INVENTION

This invention relates to a method of and an apparatus for moving a minute granular member.

As a method of moving a body, there is known a method of directly touching the body and applying a force thereto or a method housing an electromagnetic force or the like to move the body without contact.

SUMMARY OF THE INVENTION

It is an object of the present invention to provide a method which is capable of moving a body by a method entirely different from the heretofore well-known method.

It is a further object of the present invention to provide an apparatus to which such method of moving a body is applied.

It is still a further object of the present invention to provide various apparatuses using the above-described body moving apparatus.

In the present invention, a granular member is provided in a liquid and the temperature of a region in the liquid different from that where the granular member is is made different from the temperature of the region in which the granular member exists, thereby moving the granular member.

In the present invention, the granular member includes three states, i.e., gas, solid and liquid. As gas, there is a vapor bubble formed by boiling a liquid, or a bubble different from liquid and comprising a component which is not readily dissolvable in liquid, such as, for example, a bubble of argon, air, oxygen, hydrogen, helium, neon, carbon monoxide, nitrogen monoxide or methane mixed with a water solution. As solid, there are substances of relatively small density such as, for example, high molecular materials, and as liquid, there is a liquid which will not mix with an original liquid, such as, for example, a combination of water and oil.

The granular member moving apparatus according to the present invention can be well used as a light control element for converting the wave front of a light beam entering the apparatus. As a form in which the incident light beam is subjected to the conversion of wave front by the light control element, where is a form in which the light beam passes through the granular member portion of the light control element, and a case where the light beam is reflected by the granular member portion of the light control element. In each form, the emergent light beam from the light control element can be taken out on the same side as the incident light beam with respect to the liquid layer, or can be taken out on the side opposite to the incident light beam.

In the light control element, there are a first case where the liquid layer is of a light-transmitting property and the granular member also is of a light-transmitting property, a second case where the liquid layer is of a light-absorbing property and the granular member is of a light-transmitting property, and a third case where the liquid layer is of a light-transmitting property and the granular member is of a light-absorbing property. (Even; a case where part of the incident light beam is transmitted is referred to as one where the light-transmitting property exists).

The invention will hereinafer be described in detail, and the further characteristic construction of the present invention will become apparent from the following detailed description taken in conjunction with the accompanying drawings.

BRIEF DESCRIPTION OF THE DRAWINGS

FIGS. 12, 13, 14, 15, 16 and 17 illustrate the driving of the light control element.

FIGS. 19, 20, 21, 22, 23, 24, 25 and 26 illustrate embodiments for controlling the quantity of light modulated by the light control element.

FIGS. 27, 28, 29, 30, 31, 32, 33, 34, 35 and 36 illustrate embodiments for obtaining a color light beam by the light control element.

FIGS. 37, 38, 39, 40 and 41 show an embodiment of the display device to which the light control element is applied.

DESCRIPTION OF THE PREFERRED EMBODIMENTS

Figure 1:
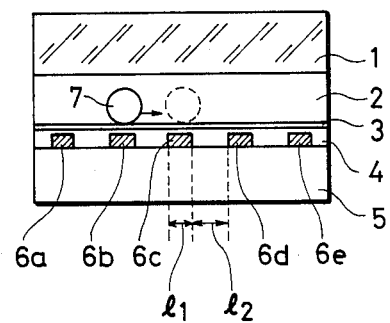
FIGS. 1 and 2 show a first embodiment of the granular member moving apparatus of the present invention.
Figure 2:
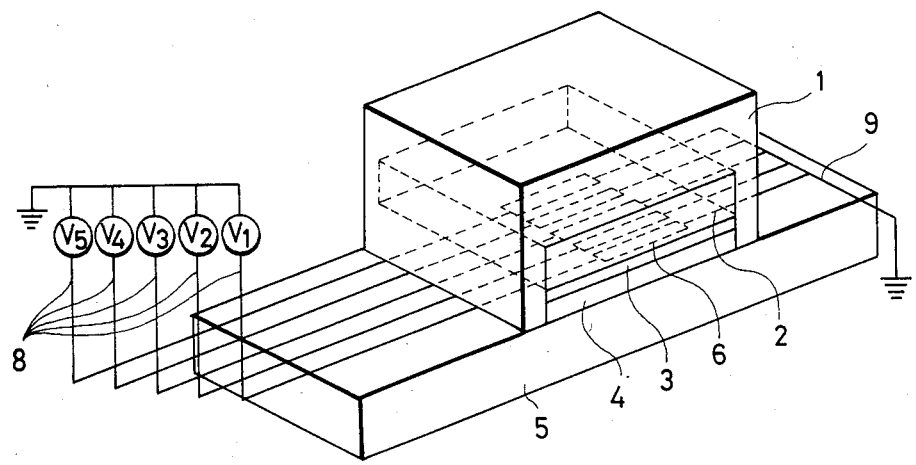

FIG. 1 is a cross-sectional view of an embodiment of the apparatus for carrying out the moving method of the present invention, and FIG. 2 is a perspective view thereof.

Reference numeral 1 designates a transparent protective plate, reference numeral 2 denotes a thin liquid layer consisting of ethyl alcohol, and reference numeral 3 designates a heat-conductive reflecting layer formed, for example, of Ta film. Reference numeral 4 denotes a heat-generating resistance member layer including heat-generating resistance members 6a, 6b, . . . , 6e isolated from one another by an insulative substance $SiO_2$, and reference numeral 5 designates an insulative back-up member. Reference numeral 7 denotes a granular member formed of a vapor bubble, and reference numeral 8 designates conductor lines connected to individual driving voltages $V_1$–$V_5$ so as to be capable of driving the heat-generating resistance members 6a, 6b, . . . , 6e independently of one another. The other ends 9 of the heat-generating resistance members 6a, 6b, . . . , 6e are grounded or set to a common voltage. Accordingly, by controlling the voltage applied to each heat-generating resistance member, the temperature of the liquid layer near the heat-generating resistance members can be controlled. The width $l_1$ of the heat-generating resistance members embedded in the layer 4 consisting of $SiO_2$ is, for example, 20 μm, and the spacing $l_2$ between the adjacent heat-generating resistance members is 50 μm.

As shown in FIG. 1, where a voltage is applied to the heat-generating resistance member 6b, the granular member 7 which is a bubble is positioned near that heat-generating resistance member, but when the voltage applied to the heat-generating resistance member 6b is cut off and a voltage is applied to the heat-generating resistance member 6c, the granular member 7 moves to the vicinity of the heat-generating resistance member 6c. In this manner, the granular member 7 moves due to a temperature difference being formed in the liquid and, in the case of the apparatus as shown in FIG. 1, the granular member moves to the vicinity of the resistance member which is generating heat. Accordingly, by choosing a heat-generating resistance member to which a voltage is to be applied, the position of the granular member can be controlled.

In the apparatus shown in FIG. 1, where a bubble is to be provided as a granular member in the liquid, a bubble can be easily formed in the liquid by applying heat to the heat-generating resistance members and forming a vapor bubble in the liquid. For example, in the apparatus of the construction shown in FIG. 1, where the liquid is ethyl alcohol, when a DC voltage of about 4.2V is applied across the heat-generating resistance member, a bubble having a diameter of the order of 150 μm is formed, and the vapor bubble once formed did not disappear even if the applied voltage was reduced. The granular member comprising the bubble remained attracted to the vicinity of the heat-generating resistance member even when the voltage applied to the heat-generating resistance member was reduced to the order of 1.5V. Thus, by this, the position of the bubble could be kept. In this case, when a voltage of 1.5V was applied to an adjacent heat-generating resistance member spaced apart by 50 μm and simultaneously therewith, the voltage applied to the heat-generating resistance member which was attracting the bubble was cut off, the bubble moved to the position of the adjacent heat-generating resistance member. Also, when the bubble was to be moved directly to a second heat-generating resistance member spaced apart by 120 μm, the bubble moved by applying a voltage of 2V to the heat-generating resistance member.

Thus, in the apparatus shown in FIG. 1, it is desirable in keeping the position of the granular member that a voltage of a degree which will not create a bubble in the liquid be applied as a bias voltage (a holding voltage) to the heat-generating resistance member which is attracting the granular member in order to hold the granular member in the liquid. As another driving method, said bias voltage may be applied to all of the heat-generating resistance members, and a relatively high voltage exceeding the bias voltage may be applied to the heat-generating resistance member lying at the position for moving the granular member to thereby attract the granular member, whereafter it may be reduced to the bias voltage. In this manner, the granular member can be held at a predetermined position.

Figure 3:
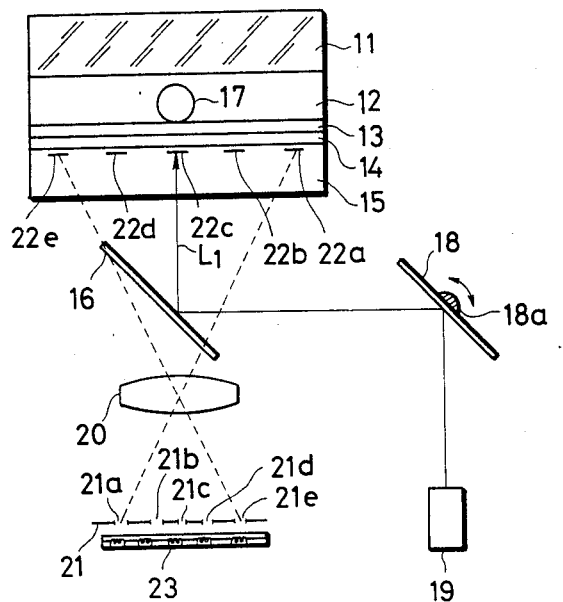
FIGS. 3 and 4 show further embodiments of the granular member moving apparatus of the present invention.

FIG. 3 shows another embodiment of the apparatus for carrying out the moving method of the present invention. Reference numeral 11 designates a transparent protective plate, reference numeral 12 denotes a liquid layer, reference numeral 13 designates a protective layer, reference numeral 14 denotes a light-absorbing layer, reference numeral 15 designates a transparent substrate, reference numeral 16 denotes a half-mirror, reference numeral 17 designates a granular member, reference numeral 18 denotes a galvano mirror, reference numeral 18a designates the rotary shaft of the galvano mirror, reference numeral 19 denotes a light source unit such as a semiconductor laser, reference numeral 20 designates an imaging optical system, reference numeral 21 denotes a slit plate having light-transmitting portions 21a, 21b, 21c, 21d, 21e, reference characters 22a, 22b, 22c, 22d and 22e designate the images of the light-transmitting portions 21a–21e of the slit plate by the imaging optical system 20, and reference numeral 23 denotes a bar-like light source.

The bar-like light source 23 illuminates the slit 21, and the light beams passing through the light-transmitting portions 21a–21e of the slit 21 are condensed on the light-absorbing layer 14 by the imaging optical system 20 and are converted into heat by this layer 14 and warms the liquid layer 12 through the protective layer. The images 22a–22e of the light-transmitting portions of the slit formed on the light-absorbing layer 14 serve to impart to the liquid layer an amount of heat sufficient to hold the granular member 17 at a position in the liquid layer r14 corresponding to the position at which said images are formed. In other words, said images perform the same function as that when a bias voltage is applied to the heat-generating resistance members shown in FIG. 1, and the position in the liquid layer at which the granular member 17 can be held can be freely selected by selecting the pattern of the opening portions of the slit 21. On the other hand, the light beam L1 from the light source unit 19 enters the light-absorbing layer 14 via the galvano mirror 18 and the half-mirror 16. This light beam L1 has a quantity of light sufficient to move the granular member 17, and the light beam absorbed by the light-absorbing layer 14 is converted into heat and transmitted to the liquid layer 12 through the protective layer 13, and the granular member moves to the position at which this light beam L1 has entered the light-absorbing layer. The position at which this light beam L1 enters the light-absorbing layer 14 can be freely controlled by rotating the galvano mirror 18.

Figure 4:
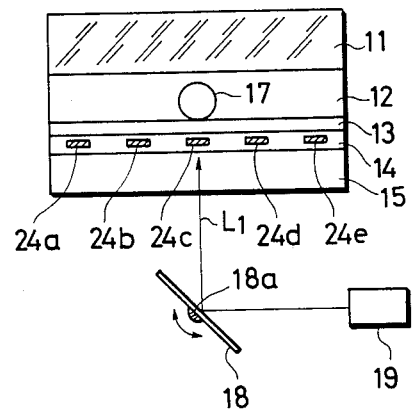

FIG. 4 shows still another embodiment of the apparatus for carrying out the moving method of the present invention. In FIG. 4, reference numerals identical to those in FIG. 3 designate identical members. Reference characters 24a, 24b, 24c, 24d and 24e designate heat-generating resistance members which are embedded in the light-absorbing layer 14. These heat-generating resistance members are for holding the position of the granular member as previously described, and a voltage sufficient to hold the granular member is applied to each of the heat-generating resistance members. On the other hand, the amount of heat for moving the granular member is provided by the light beam from the light source 19 as in the apparatus shown in FIG. 3.

Figure 5:
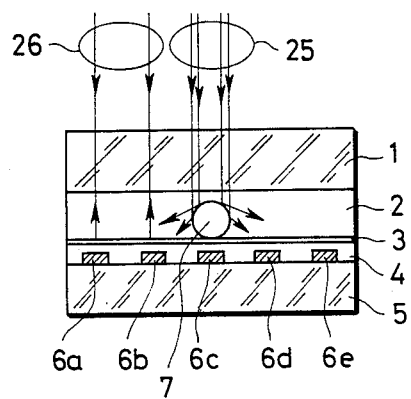
FIGS. 5, 6, 7, 8, 9, 10 and 11 show light control elements to which the granular member moving apparatus according to the present invention is applied.

FIG. 5 shows an embodiment of the light control element using the above-described granular member moving apparatus, and the construction of the light control element is the same as that of the apparatus shown in FIG. 1. Most of a light beam 25 entering the position at which a vapor bubble 7 exists is totally reflected by the surface of the vapor bubble 7. The totally reflected light beam travels in various directions and therefore, the rate at which such light beam returns in a direction parallel to the light beam 25 is small. On the other hand, a light beam 26 entering the portion in which the vapor bubble does not exist is regularly reflected by the light-reflecting layer 3 and therefore, most of the light beam returns in a direction parallel to the incident light beam 26. Accordingly, a light beam having a wave front different from that of the incident light beam exists from the light control element. In such a case, when observed from the direction of the incident light beam, the portion in which the vapor bubble 7 exists looks black and the other portion looks light. Accordingly, by selecting the heat-generating resistance members 6a–6b to which a voltage is applied, the light and dark of the light beam from the light control element can be controlled.

Also, in the light control element shown in FIG. 5, where it is desired to take out one of the light beam scattered by the vapor bubble and the regularly reflected light beam from a state in which the two light beams are mixedly present, the conventional Schlieren optical system may be used.

Figure 6:
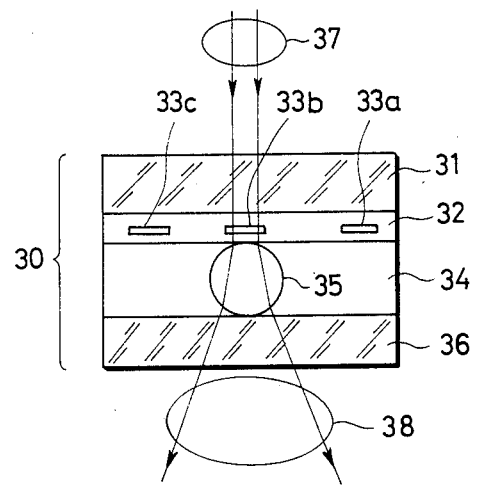

FIG. 6 shows another embodiment of the light control element using the above-described granular member moving apparatus. Reference numeral 31 designates a substrate having light transmittivity, reference numeral 32 denotes a transparent insulating layer in which heat-generating resistance members 33a–33c are embedded, reference numeral 34 designates a liquid layer having light transmittivity, reference numeral 35 denotes a bubble which is a granular member, and reference numeral 36 designates a transparent protective plate. When a light beam 37 is caused to enter the light control element 30 comprising the members 31–36, the bubble 35 serves as a concave lens. Accordingly, as light beam 38 emerging from the light control element 30 emerges with a wave front different from the wave front of the incident light beam. A light beam having entered the portion in which the bubble 35 does not exist emerges without being subjected to the wave front converting action. As described above, by controlling the voltage applied to the heat-generating resistance members 33a, 33b, 33c at desired positions, movement of the bubble 35 is made possible and it is possible to convert a part of the wave front of the incident light beam. If, as described above, the Schlieren optical system is applied for the emergent light beam in which such different wave fronts are mixedly present, there can be realized a light modulating apparatus.

Figure 7:
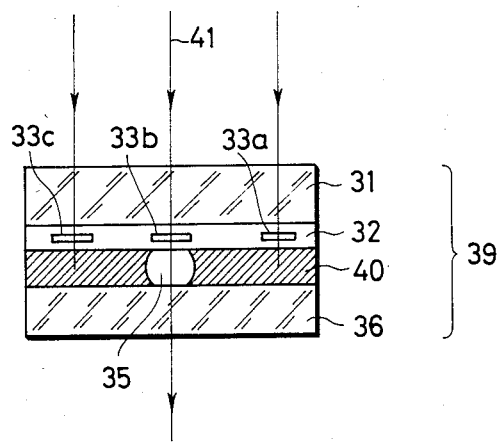

FIG. 7 shows still another embodiment of the light control element using the above-described granular member moving apparatus. Unlike the light control elements shown in FIGS. 5 and 6 wherein a light beam subjected to the change of the wave front and a light beam not subjected to the change of the wave front are mixedly present and emerge, the light control element 39 shown in FIG. 7 is an element from which only the light beam subjected to the change of the wave front emerges. Accordingly, most of the construction of the light control element shown in FIG. 7 is the same as the construction of the element shown in FIG. 3, but in the element shown in FIG. 7, the liquid layer 40 is formed of a substance which does not transmit light therethrough. The element 39 shown in FIG. 7 transmits therethrough only a light beam 41 having entered the position at which the bubble 35 which is a granular member exists, by making the relation between the size of the bubble 35 and the thickness of the liquid layer into a predetermined proportion. As described hitherto, light control for the incident light beam is possible by inputting a predetermined applied voltage signal to one of the heat-generating resistance members 33a, 33b and 33c so as to move the bubble 35 to a desired position. The incident light beam in this case need not always be a parallel light beam, but may be a light beam having a plurality of wave fronts or a disturbed wave front. Also, by making the boundary surface between the liquid layer 40 and the insulating layer 32 or the boundary surface between the liquid layer 40 and the transparent protective plate 36 into a rough surface, it also becomes possible as desired to increase the diffusiveness of the light beam passed through the bubble 35.

In the construction of the element 39 shown in FIG. 7, the element has been shown as one from which a light beam whose wave front is varied by the granular member emerges, but conversely to this example, the liquid layer 40 may be formed of a light-transmitting substance and the granular member 35 may be formed of a light-intercepting substance in order to cause a light beam whose wave front is not varied to emerge as a transmitted light.

Figure 8:
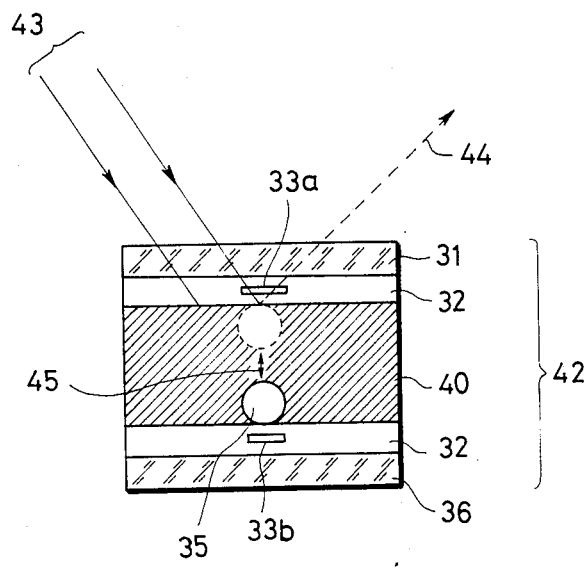

FIG. 8 shows yet still another embodiment of the light control element using the granular member moving apparatus according to the present invention. In this embodiment, the thickness of the opaque liquid layer 40 is made greater than the diameter of the light-transmitting granular member 35 and a pair of heat-generating resistance members 33a and 33b are disposed at the opposite sides of the liquid layer 40. When a voltage signal is applied to one of the heat-generating resistance members of the element 42, the granular member 35 moves through the liquid layer 40 in the direction of the thickness of the liquid layer indicated by arrow. Assuming that a light beam 43 is caused to enter from the side of the light-transmitting substrate 31 and a voltage signal is applied to the heat-generating resistance member 33a, the granular member 35 moves toward the substrate 31 and the incident light is reflected by the surface thereof and emerges from the light control element 42 as indicated by broken line 44. When a voltage signal is applied to the heat-generating resistance member 33b, the incident light 43 is absorbed by the opaque liquid layer 40.

When observed from the side of the light-transmitting substrate 31, light and dark can be observed as a voltage signal is applied to the heat-generating resistance member 33a or 33b.

In the element 42 shown in FIG. 8, a construction has been shown in which only the light beam reflected by the granular member 35 emerges from the element, but by making the liquid layer 40 shown in FIG. 8 into a light-reflective liquid layer and forming the granular member 35 by a light-absorbing substance, only the light beam of the incident light beam 43 which is not subjected to the change of the wave front can be taken out as a reflected light beam from the element 42.

Figure 9:
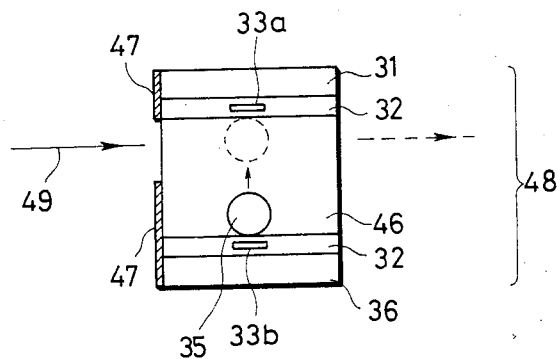

FIG. 9 show a further embodiment of the light control element using the granular member moving apparatus of the present invention. In this embodiment, the construction for moving the granular member 35 is the same as the element shown in FIG. 8. In the element 48 shown in FIG. 9, a light beam 49 is caused to enter the element 48 from a direction orthogonal to the direction of movement of the granular member. Where the element 48 is used as the transmission type, it is possible to use a light-transmitting liquid if the thickness of the liquid layer 46 in the direction of travel of the incident light beam 49 is great, and it is possible to use a light-intercepting liquid instead of the light-transmitting liquid if the thickness of the liquid layer 46 is of the same degree as the diameter of the granular member 35. It is also possible to use the element 48 of FIG. 9 as the reflection type and in such case, the thickness of the liquid layer 46 and the diameter of the granular member are set to substantially the same degree. Whether the light beam reflected from the element 48 is the reflected light beam by the granular member 35 or the reflected light beam by the liquid of the liquid layer 46 can be freely set. Further, as shown in FIG. 9, the element 48 may be provided with light-intercepting means 47. Such light-intercepting means 47 is for preventing the incident light beam 49 from impinging on the granular member 35 when the granular member 35 is attracted to one of the heat-generating resistance members. Also, such light-intercepting means 47 is for preventing the incident light beam from arriving at the granular member when the granular member exists at a certain location, and it is readily possible to provide such light-intercepting means 47 also in the elements shown in FIGS. 5, 6 and 7. In the element 42 shown in FIG. 8, the incident light beam 43 does not arrive at the granular member 35 when the granular member 35 is attracted to the heat-generating resistance member 33b and therefore, it is not necessary to provide the light-intercepting means 47. The above-described light-intercepting means 47, as will later be described, is effective where the light control element is applied to various apparatuses.

Figure 10:
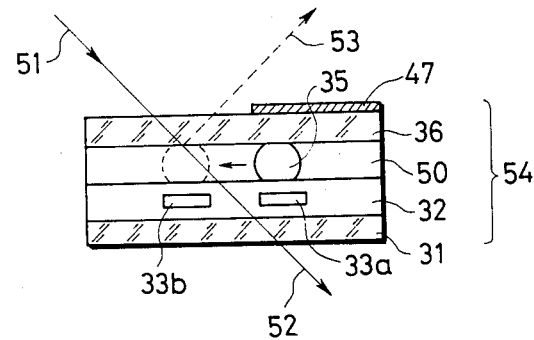

FIG. 10 shows still a further embodiment of the light control element to which the apparatus of the present invention is applied. The members 31, 32, 33a, 33b, 35, 36 and liquid layer 50 which constitute the element 54 shown in FIG. 10 are formed of optically transparent materials. When the bubble 35 which is a granular member exists near the heat-generating resistance member 33a, a light beam entering the vicinity of the heat-generating resistance member 33b passes through the element 54 and becomes a transmitted light 52.

On the other hand, when the bubble 35 exists near the heat-generating resistance member 33b, the incident light beam 51 is subjected to a total reflecting action in the boundary surface between the bubble 35 and the transparent protective layer 36 and becomes a reflected light 53. To widen the area of contact between the bubble 35 and the transparent protective layer 36 in the boundary surface to thereby increase the total reflection efficiency of the incident light beam 51, it is effective to make the thickness of the transparent liquid layer 50 smaller than the diameter of the bubble when it exists substantially in a spherical shape and make the bubble 35 into a flat shape in the transparent liquid layer 50. Also, in the other area on the transparent protective layer 36 than the predetermined incidence position of the incident light 51 near the heat-generating resistance member 33b, it is also possible to provide the above-described light-intercepting means 47 for the purpose of eliminating any noise light.

Figure 11:
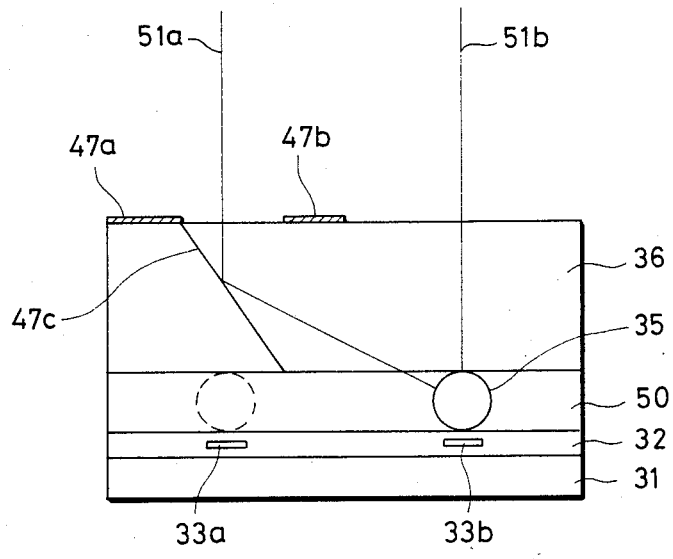

FIG. 11 shows an embodiment which positively utilizes a light-intercepting portion to improve the light utilization efficiency of the light control element. A feature of this embodiment is that in addition to light-intercepting members 47a and 47b, a light-reflecting layer 47c is also endowed with the light-intercepting function. Thus, a light beam 51a incident from the upper portion of the heat-generating resistance member 33a which should originally be shielded from light has its direction of travel changed by the light-reflecting layer 47c and enters the bubble 35. With such a construction, the light beam which is not utilized for light control but is only intercepted in the elements shown, for example, in FIGS. 9 and 10 can be utilized as a light beam for light control and as a result, the light utilization efficiency is improved.

As embodiment of the basic driving system of the above-described light control element will now be described. FIG. 12 shows an embodiment of the driving device of the light control element, and FIG. 13 is a time chart thereof. In FIG. 12, consider a condition in which the granular member 35 is positioned near one of the heat-generating resistance members 33a and 33b, for example, a condition in which the granular member 35 is positioned near the heat-generating resistance member 33b and of the incident light beam 58, the light beam to the area in which the light-intercepting member 47 does not exist is subjected to no light controlling action and is transmitted as an emergent light 59. As shown in FIG. 13A, when a driving signal 56 has entered a voltage generating circuit 55 at a certain time $T_1$, the voltage generating circuit 55 imparts to the heat-generating resistance member 33a an applied voltage Vt necessary for movement of the granular member as a control signal 57a shown in FIG. 13B, on the basis of the memory that the heat-generating resistance member driven before the time $T_1$ is 33b. Simultaneously therewith, the voltage generating circuit 55 cuts off the applied voltage Vh so far imparted to the heat-generating resistance member 33b. This is the control signal 57b at this point of time and is shown in FIG. 13C. As a result, in the liquid layer 34, a temperature gradient changing from a high temperature to a low temperature occurs from the heat-generating resistance member 33a side to the heat-generating resistance member 33b side, and the granular member 35 moves to the vicinity of the heat-generating resistance member 33a. Next, at a point of time whereat the driving signal 56 has become a zero signal after a time $\tau$, the control signal 57a changes over the applied voltage from Vt to Vh. Vh is a voltage for holding the granular member near the heat-generating resistance member and may sufficiently be of a value less than Vt. In some cases Vh may be a zero signal. As long as this condition continues, the incident light 58 becomes as emergent light 59 subjected to some light controlling action by the granular member 35. The condition in which the control signal 57a is the holding voltage Vh and the control signal 57b is a zero voltage continues until the next driving signal 56 is imparted at time $T_2$. In this manner, the voltage generating circuit 55 basically has the function of storing the current condition under which the granular member is placed, generating a predetermined voltage in response to the driving signal 56 to move the granular member and maintaining that condition till the next driving signal. In FIG. 13, a binary signal can be utilized as the driving signal 56 and therefore, 0 and 1 are marked in the vertical axis. Also, the time during which the voltage for moving the granular member is applied has been set equally to the time $\tau$ during which the driving signal 56 continues, whereas this is not always restrictive. As the initial state of the element, a control signal may be imparted to forcibly position the granular member near one of the heat-generating resistance members before the driving signal 56 is imparted.

An embodiment of the driving system of an array element in which a plurality of elements shown in FIG. 12 are arranged in a row will now be shown. The driving system shown below is applicable to both of an element in which the direction of movement of the granular member and the direction of arrangement of the arrays are made parallel to each other and an element in which the direction of movement of the granular member and the direction of arrangement of the arrays are made orthogonal to each other.

FIG. 14 is a block diagram for showing an array element in which, for simplicity of illustration, three elements shown in FIG. 12 are arranged, and FIG. 15 is a time chart thereof. The manner in which elements 30a, 30b and 30c control the granular member by the signals from voltage generating circuits 55a, 55b and 55c shown in FIG. 14 is the same as what is shown in FIG. 12 and therefore, herein, description will be made of the circuit until the signals are transmitted to the voltage generating circuits 55a, 55b and 55c. In FIG. 14, an information signal 61 (FIG. 15B) input to each element 30a, 30b, 30c is imparted to an array-like element control circuit 62 in synchronism with a clock signal 60 (FIG. 15A). This control circuit 62 has (i) the function of separating the time-sequentially imparted information signal 61 into picture element signals of the elements 30a, 30b and 30c by referring to the clock signal 60, (ii) the function of storing the information signal 61 (picture element signal) corresponding to one line, (iii) the function of comparing the newest information signal for controlling each element with the information signal preceding the stored one line and discriminating whether the driving signals 56a, 56b and 56c (FIGS. 15C, 15D and 15E) to the elements should be imparted, and (iv) the function of storing the newest information signal 61 corresponding to one line instead of the information signal preceding the one line. Further, this control circuit 62 has the function of selecting and changing over the voltage generating circuits 55a, 55b and 55c and generating driving signals 56a, 56b and 56c on the basis of said judgement where the elements 30a, 30b and 30c are time-sequentially driven, or the function of temporally imparting driving signals 56a, 56b and 56c each corresponding to one line to the voltage generating circuits 55a, 55b and 55c where the elements 30a, 30b and 30c are driven at a time.

As shown in FIG. 15B, let it be assumed that the granular member is in a condition in which it does not control the incident light when the information signal 61 is, for example, of a value 0 for each element and that the granular member is in a condition in which it controls the incident light when the information signal 61 is of a value 1. FIG. 15A, as described above, shows the clock signal 60 and, in FIG. 15A, clock signals corresponding to three lines (I)–(III) are shown. Let it be defined that immediately before time T₀, each element is in a condition corresponding to the value 0. In the line (I), the information signal 61 of the elements 30a and 30b is of the value 1 and therefore, driving signals 56a and 56b are imparted to the elements 30a and 30b, respectively, and the elements 30a and 30b assume a condition in which they control the incident light. Also, the information signal of the line (I) is of the value 0 for the element 30c and therefore, no driving signal is imparted to the element 30c. Next, the information signal of the line (II) designates a condition in which the elements 30b and 30c correspond to the value 1 and the element 30a corresponds to the value 0 and therefore, the driving signals 56a and 56c for changing the element 30b from a condition in which it controls the light to a condition in which it does not control the light and changing the element 30c from a condition in which it does not control the light to a condition in which it controls the light must be imparted to the elements 30a and 30c, respectively. The line (III) designates a condition in which the elements 30a and 30c correspond to the value 1 and the element 30b corresponds to the value 0 and therefore, the driving signals 56a and 56b for changing the element 30a from a condition in which it does not control the light to a condition in which it controls the light and changing the element 30b from a condition in which it controls the light to a condition in which it does not control the light must be imparted to the elements 30a and 30b, respectively. As previously described, the driving signals may be imparted to the elements time-sequentially or at a time in each line (I)–(III).

An embodiment of the driving system in a case where the light control elements shown in FIG. 12 are arranged two-dimensionally are shown in FIGS. 16 and 17. This embodiment is such that a plurality of one-dimensional element arrays described in connection with FIGS. 14 and 15 are arranged in a direction orthogonal to the array direction. In FIG. 16, the flow of signals for driving the elements from array-like element control circuits 62l, 62m and 62n is the same as what has been described with respect to the above-described embodiment and therefore need not be described here. Reference characters 55a–55i designate circuits for generating the abovedescribed driving signals. In FIG. 16, in synchronism with a clock signal 60 (FIG. 17A), a matrix information signal 63 (FIG. 17B) is allotted to each information signal 61l, 61m, 61n. The information signals 61l, 61m and 61n may be time-sequentially supplied to array-like element control circuits 61l, 62m and 62n or may be temporally accumulated as one matrix information unit A and then supplied to the array-like element control circuits at a time on the basis of the clock signal. FIG. 17C shows the information signal 61l input to the control circuit 62l, FIG. 17D shows the information signal 61m input to the control circuit 62m, and FIG. 17E shows the information signal 61n input to the control circuit 62n. These information signals 61l, 61m and 61n are ones to which the matrix information signal shown in FIG. 17B has been allotted as the information signal of each line.

The basic embodiments of the driving system have been described above with respect to a case where the light control element shown in FIG. 12 is single, a case where a plurality of such light control elements are arranged in the form of one-row array and a case where a plurality of such light control elements are arranged in the form of a two-dimensional matrix. The light control element shown in FIG. 12 is of a construction in which a temperature gradient is created in the liquid layer by the use of two heat-generating resistance members to thereby move the granular member, but a driving system in which, as shown in FIG. 4, a writing light is applied from outside and the light is converted into heat to thereby create a temperature gradient can also be easily obtained from the above-described driving device.

Figure 18:
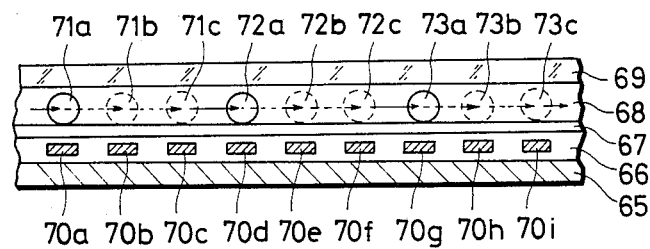
FIG. 18 shows a light control element to which the granular member moving apparatus of the present invention is applied.

In the foregoing embodiments, description has been made of a granular member moving apparatus for reciprocally moving the granular member, but description will now be made of an apparatus for moving the granular member always in one direction. FIG. 18 shows an embodiment of the apparatus for moving granular members in a line form in one direction. In FIG. 18, reference numeral 65 designates a back-up member, reference numeral 66 denotes a heat-generating resistance member layer formed of an insulative substance in which heat-generating resistance members 70a–70i are embedded, reference numeral 67 designates an insulating layer having heat conductivity, reference numeral 68 denotes a liquid layer for creating a temperature gradient by selective heat generation of the heat-generating resistance members, and reference numeral 69 designates a protective layer. Reference characters 71a, 72a and 73a denote granular members, reference characters 71b and 71c designate the granular member 71a after moved, reference characters 72b and 72c denote the granular member 72a after moved, and reference characters 73b and 73c denote the granular member 73a after moved. Now, the granular members 71a, 72a and 73a exist near the heat-generating resistance members 70a, 70d and 70g, respectively, by a bias voltage for position control being applied to the heat-generating resistance members 70a, 70d and 70g. In the next state, a voltage is applied to the heat-generating resistance members 70b, 70e and 70h and simultaneously therewith, the voltage applied to the heat-generating resistance members 70a, 70d and 70g is cut off, whereby the granular members 71a, 72a and 73a move to the positions indicated by 71b, 72b and 73b, respectively. At this time, paying attention to the granular member 72a, for example, a temperature gradient is created between the heat-generating resistance members 70b and 70d and between the heat-generating resistance members 70d and 70e at a time, but since the distances between these heat-generating resistance members differ from each other, the temperature gradient between the heat-generating resistance members 70d and 70e is steep relative to the temperature gradient between the heat-generating resistance members 70b and 70d. Accordingly, the granular member 72a does not move to the position indicated by 71b, but moves to the position indicated by 72b. Therefore, in FIG. 18, the heat-generating resistance members are divided into a first group comprising 70a, 70d, 70g, . . . , a second group comprising 70b, 70e, 70h, . . . and a third group comprising 70c, 70f, 70i, . . . and a voltage is time-sequentially applied to each group, whereby the granular members 71a, 72a and 73a move from left to right as viewed in FIG. 18 while keeping the intervals therebetween. That is, the granular members can be transferred without injuring the information expressed by the presence or absence of the granular members and the intervals between the adjacent granular members. In this granular member moving apparatus, the granular members move in one direction and therefore, where the liquid layer 68 does not form a circulation path, there is required means for producing the granular members and removing or extinguishing the granular members. For example, where each granular member comprises a bubble, use in made of heating means for heating the liquid layer to produce a bubble and means for cooling and extinguishing the used bubble or means for removing the used bubble out of the apparatus by the use of the buoyancy of the liquid. Such production of the granular member at the movement starting point of the granular member and the removal or extinction of the granular member at the movement terminal of the granular member can be relatively easily accomplished where the granular member is a bubble. However, where the granular member is a solid or the like, a form is required in which the movement starting point and terminal of the granular member moving apparatus are connected together by communicating means so that the granular member may be circulated.

Description will now be made of an embodiment for controlling the quantity of light to be modulated in a light control element to which the granular member moving apparatus of the present invention is applied. FIGS. 19A and 19B show an embodiment of the light control element capable of controlling the quantity of modulated light and capable of forming a so-called half-tone. In FIG. 19, there is shown the construction of the minimum unit of the light control element for controlling the quantity of light of a picture element, FIG. 19A being a schematic plan view and FIG. 19B being a side cross-sectional view. In FIG. 19, reference numeral 74 designates a granular member to be transferred, reference numeral 75 denotes a light intercepting portion for shielding the granular member from an illuminating light beam 83, reference numeral 76 designates a light beam transmitting portion, reference numeral 77 denotes a transparent protective layer such as a glass plate, reference numeral 78 designates an opaque liquid layer which does not transmit the light beam therethrough, reference numeral 79 denotes a dielectric protective film reference numeral 80 designates an electrode layer including transparent heaters 82a and 82b, and reference numeral 81 denotes a glass substrate. The illuminating light beam 83 is incident from the direction of arrow. In the case of the present embodiment, the granular member 74 may preferably be a bubble. Also, as shown, the thickness of the opaque liquid layer 78 should desirably be smaller than the diameter of said bubble so that the bubble is in intimate contact with the upper and lower layers. If, in such a state, the bubble exists in the light beam transmitting portion 76, the light beam is transmitted only through the bubble 74 and emerges rearwardly. The heaters 82a and 82b can be alternately supplied with power to generate heat, whereby the bubble can be transferred between the light-intercepting portion and the light beam transmitting portion or be stagnated in one of them. Also, the illuminating light beam is a continuous illumination subjected to no modulation.

FIGS. 20A and 20B illustrate the driving method of the heaters for forming the half-tone shown in FIGS. 19A and 19B, FIG. 20A representing the relation between the voltage supplied to the heater of the light-intercepting portion and time, and FIG. 20B representing the relation between the voltage supplied to the heater of the light beam transmitting portion and time. As shown in FIG. 20A, a voltage is first applied to the heater of the light-intercepting portion for a time $t_1$ to cause the bubble to stay on this heater for the time $t_1$, and then, as shown in FIG. 20B, the application of the voltage is changed over to the heater of the light beam transmitting portion 76 to transfer the bubble to the same portion and cause the bubble to stay on this heater for a time $t_2$. When the period T of exposure is $T = t_1 + t_2$ and the time $t_2$ during which the bubble stays in the light beam transmitting portion 76 in the range in which the period T is constant is varied, the average exposure amount within the exposure time T is proportional to $t_2/T$. Accordingly, by varying the time $t_2$ in accordance with a signal, the control of the quantity of light corresponding to the half-tone can be accomplished.

FIG. 21 illustrates a driving circuit for realizing the driving method shown in FIGS. 20A and 20B. In FIG. 21, reference numeral 84 designates a light modulating element including heaters 82a and 82b, reference numeral 85 denotes a switching circuit, reference numeral 86 designates a voltage generating circuit, reference numeral 87 denotes a control circuit, and reference numeral 88 designates a signal generating circuit. The half-tone signal generated by the signal generation circuit 88 is converted into a control signal for controlling the power supply time as described in connection with FIGS. 20A and 20B, in the control circuit 87, and on the basis of this signal, the switching circuit 85 effects the switching between the voltage generating circuit 86 and the heaters 82a, 82b. Realization of the above-described circuits can be easily achieved by the prior art and therefore, description of the concrete constructions of those circuits is omitted herein.

Figure 22:
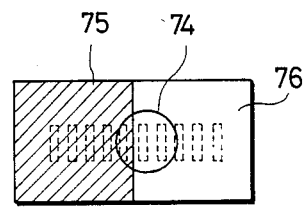
Figure 23A:
Figure 23B:
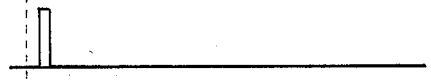
Figure 23C:
Figure 23D:
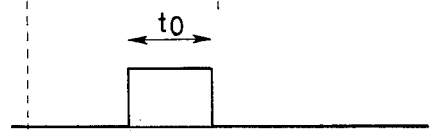
Figure 23E:
Figure 23F:
Figure 23G:
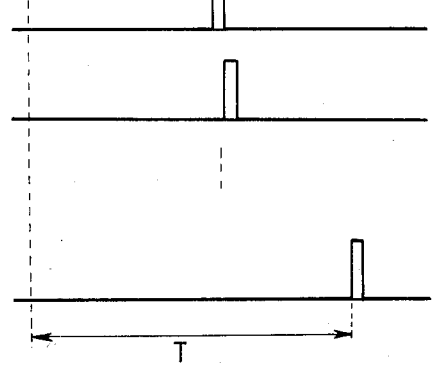

FIGS. 22 and 23A-23G show a further embodiment of the light control element which is capable of forming a half-tone, FIG. 22 being a schematic plan view of the light control element. The basic construction of this element is the same as that of the element shown in FIG. 91. The only difference of the element shown in FIG. 22 from the element shown in FIG. 19 is that, as indicated by broken lines in FIG. 22, a number of heaters contained in the lower portions of the light-intercepting portion 75 and the light beam transmitting portion 76 are arranged from the light-intercepting portion 75 to the light beam transmitting portion 76 and step-wise control of the position of the granular member 74 is made possible so that only a part of the granular member 74 appears from the light-intercepting portion 75 to the light beam transmitting portion 76 by change-over of the voltage applied to the heaters.

The granular member controlling method for forming a half-tone will hereinafter be described by reference to the time charts shown in FIG. 23. FIG. 23A-23G show the pulse voltage applied to each heater. It is to be understood that the leftmost heater in the element shown in FIG. 22 is the first heater. In FIG. 22, it is to be understood that the granular member 74 exists on the first heater and the granular member is to be moved onto the ith heater. In that case, as shown in FIG. 23, a pulse-like voltage is applied to the heaters in succession from the first heater to thereby move the granular member to the ith heater and the granular member is held on the ith heater for a predetermined time $t_0$, whereafter the granular member is reversely transferred in the order of the i-1th heater and the i-2th heater and is again returned to the first heater in the light-intercepting portion 75. Assuming that when the granular member rests on the ith heater, a part of the granular member is shielded by the light-intercepting portion and that the area when a part of the granular member 74 is shielded is S as opposed to the entire light beam transmitting area So of the granular member 74, the amount of transmission of the light beam varies in conformity with the ratio S/So. Accordingly, a half-tone can be obtained by selecting the position of the heater on which the granular member is caused to rest.

In this case, it is necessary in improving the number of tones of the half-tone and the light utilization efficiency to increase the number of heaters as far as possible and to control the driving time so that the time during which the granular member is transferred is sufficiently shorter than the time $t_0$ during which is granular member rests in the ith heater. The driving circuit of the present embodiment can be realized by a method similar to the method of realizing the circuit of FIG. 21 and therefore need not be described.

FIG. 24 is a plan view showing still a further embodiment of the light control element which is capable of forming a half-tone. This embodiment differs only in the shapes of the light-intercepting filter 75 and the opening portion 76 from the embodiment of FIG. 22, and is just the same as the embodiment of FIG. 22 in the other structural points of the element and the driving method. In the present embodiment, the opening portion 76 is wedge-shaped as shown, and this leads to an advantage that control of the quantity of transmitted light relative to the amount of movement of the bubble 74 can be more precisely accomplished than in the embodiment of FIG. 22. The shape of the opening portion 76 is not limited to the wedge-like shape, but any shape which will enable a relation between the position of the bubble and the quantity of transmitted light to the obtained in conformity with the intended purpose, such as a shape in which the change in the position of the bubble 74 and the quantity of transmitted light have a linear proportional relation, can be chosen.

FIG. 25 illustrates yet still a further embodiment of the light control element which is capable of forming a half-tone. In the case of this Figure, a picture element comprises two sets of granular member moving mechanisms. In the case of the present embodiment, bubbles 77 and 78 can be independently transferred from light-intercepting portions 79 and 80 to light beam transmitting portions 81 and 82, and each bubble stays at the light beam incidence portion for a predetermined time, and then is again transferred to the light-intercepting portion. In the present embodiment, the half-tone is controlled by the number of bubbles present in the light beam transmitting portions. In the construction of FIG. 25, the number of bubbles which can be present in the light beam transmitting portions at a time is 0, 1 or 2, and if the number of bubbles to be transferred to the light beam transmitting portions is controlled accordance with the quantity of light to be modulated, three-stage modulation of the quantity of light of the transmitted light beam can be achieved in accordance therewith. Likewise, if the number of combinations of bubbles and heaters is further increased, modulation of the quantity of light in more stages can of course be accomplished.

FIG. 26 shows a further embodiment of the light control element which is capable of forming a half-tone. This embodiment is entirely identical in principle to the embodiment of FIG. 25. In FIG. 26, portions 83-86 indicated by hatching are light-intercepting portions, and bubbles 87-90 are transferred from the light-intercepting portions 83-86 toward the center. If the light-intercepting portions and the opening portions are arranged as shown in FIG. 26, there will be an advantage that for example, where this light modulating element is two-dimensionally arranged and applied to a display or the like, it is easy to render the resolving powers in longitudinal and lateral directions identical to each other.

According to the method as described in the foregoing embodiments, a half-tone can be easily realized by the use of a granular member moving mechanism and it is possible to provide a light modulating element which is applicable to high-quality displays, printers or the like.

While all of the foregoing embodiments have been described as light transmitting type elements, the present invention is of course applicable also to light reflecting type elements. Also, it is possible to obtain a half-tone by placing an opaque granular member in transparent liquid, instead of placing a transparent bubble in opaque liquid as in the above-described embodiments, and controlling the position, speed, staying time, etc. of the granular member.

Figure 29:
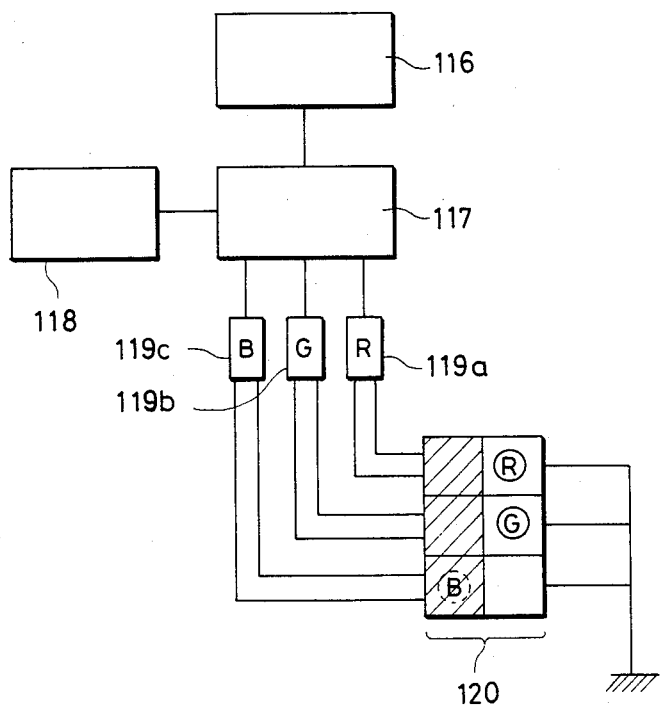

FIGS. 27 to 36 show light control elements to which the granular member moving apparatus of the present invention is applied and which is suitable for obtaining a desired color light beam. FIGS. 27-29 shows an embodiment of the light control element, FIG. 27 being a plan view of the element and FIG. 28 being a cross-sectional view of the element. These Figures show an element used for the light control of a picture element constituting a colored image or the like and actually, a plurality of such light control elements as shown in FIGS. 27 and 28 are used. Reference numerals 101–103 designate light-intercepting filters for intercepting the incident light beam, reference numerals 104–106 denote color filter transmitting therethrough lights of red (R), green (G) and blue (B) wavelengths, respectively, and reference numerals 107–109 designate bubbles. Reference numeral 110 designates a glass plate, reference numeral 111 denotes opaque liquid which does not transmit light therethrough, reference numeral 112 designates a protective film formed of a transparent dielectric material such as SiO$_2$, reference numeral 113 denotes a transparent electrode layer including transparent heaters 114a and 114b, and reference numeral 115 designates a glass substrate. The incident light beam enters from the direction of arrow and only when the bubbles exist below the color filters, it passes through the bubbles to the rear of the element. To improve the transmission efficiency of the light beam, it is preferable that the thickness of the opaque liquid layer 111 be somewhat smaller than the diameter of the bubbles and the bubbles be in intimate contact with the upper and lower boundary surfaces. To cause the bubbles to be transferred between the light-intercepting portion and the color filters, the transparent heaters 114a and 114b below the bubbles may be supplied with power to generate heat and the switching thereof may be effected, but the principle of the transfer and the method of driving the transparent heaters have previously been described and need not be described here.

A method of obtaining a desired color light beam of the use of this light control element will now be described by reference to the drawings. For example, to obtain a green light by the use of the element of the present embodiment, the bubble 108 is transferred to below the color filter 105 as shown in FIG. 27 and the other bubbles 107 and 109 are caused to stay below the light-intercepting filters and a white light is caused to enter. The white light is transmitted only through the portion of the green filter 105 in which the bubble 108 exists and the other part is absorbed by the opaque liquid and therefore, the emergent light beam is colored in green. To produce the other colors than R, G and B, two or three bubbles can be transferred to the color filter portion at a time to thereby mix colors. Further, if the quantity of light is controlled for each of R, G and B by the use of the previously described method of obtaining a half-tone, there can be obtained a color light beam having any desired hue and intensity.

Referring to FIG. 29 which is a block diagram showing the driving circuit of this light control elements, reference numeral 120 designates a picture element of a color display element, reference numeral 116 denotes a color signal generating circuit, reference numeral 117 designates an element control circuit, reference numeral 118 denotes a voltage generating circuit, and reference characters 119a–119c designate the switching circuits of heaters for colors R, G and B, respectively. The element control circuit 117 generates a driving signal for each color in response to a color signal generated by the color signal generating circuit 116, and on the basis of this driving signal, the switching circuits 119a–199c operate to control the positions of R, G and B bubbles and produce a color light beam. As described above, any desired color light beam can be produced for each picture element by the light control element and the driving circuit and thus, the application of such light control element to an image display element or the like becomes possible.

Figure 30:
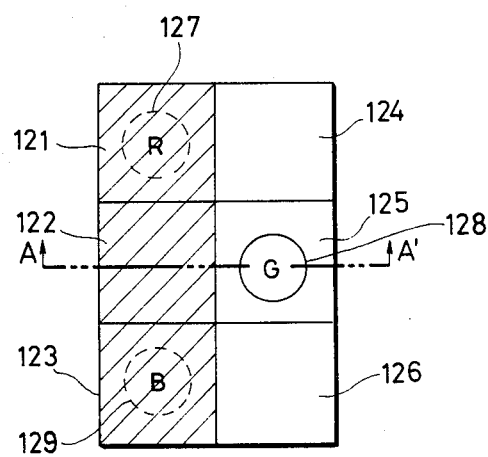
Figure 31:
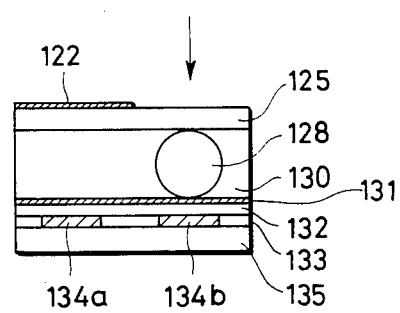

FIGS. 30–31 show another embodiment of the light control element for obtaining a color light beam, FIG. 30 being a plan view of the element and FIG. 31 being a cross-sectional view of the element. These Figures shown only a picture element for obtaining a colored image. Reference numerals 121–123 designate light-intercepting filters for intercepting the incident light beam, reference numerals 124–126 denote glass plates, and reference numerals 127–129 designate granular members colored in red (R), green (G) and blue (B), respectively. As these granular members, utilization may be made of commercially available below or solid minute balls such as latex balls or microcapsules. Reference numeral 130 designates a colorless, transparent liquid such as water or ethyl alcohol, reference numeral 131 denotes a light reflecting layer comprising a deposited film of a metal such as tantalum or aluminum, reference numeral 312 designates a protective layer formed of a transparent dielectric material such as SiO$_2$, reference numeral 133 denotes a transparent electrode layer including heaters 134a and 134b, and reference numeral 135 designates a glass substrate. The illuminating light beam enters from the direction of arrow and is scattered by the granular members when the granular members exist in this light beam. To cause the granular members to be transferred between the light-intercepting portion and the glass plates 124–126, the heats 134a and 134b below the granular members may be supplied with power to generate heat and the switching thereof may be effected, but the principle of the transfer and the driving method have already been described in detail and therefore need not be described here.

A method of obtaining a desired color light beam by the use of this light control element will now be described by reference to the drawings. For example, to obtain a green light by the use of the element of the present embodiment, the granular member 128 is transferred to below the glass plate 125 as shown in FIG. 31 and other granular members 127 and 129 are caused to stay below the light-intercepting filters and a white light is caused to enter. The white light is scattered by the granular member 128 and the other light is regularly reflected and therefore, the reflected light beam is colored in green. To generate the other colors than R, G and B, two or three bubbles can be transferred to the glass plate portion at a time to thereby mix colors. Further, if the method of controlling the quantity of light for each of colors R, G and B as previously described is combined with this method, there can be obtained a color light beam having any desired hue and intensity.

The driving of the element can be achieved by a method similar to the method shown in FIG. 29 and therefore need not be described.

Figure 32:
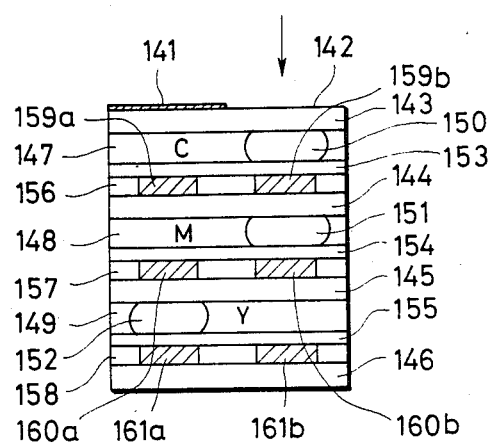

FIG. 32 is a cross-sectional view of still another embodiment of the light control element for obtaining a color light beam. In FIG. 32, reference numeral 141 designates a light-intercepting filter, reference numeral 142 denotes a light beam incidence portion, reference numerals 143-146 designate glass plates, reference numerals 147-149 denote light-transmitting liquid layers colored in cyan (C), magenta (M) and yellow (Y), respectively, reference numerals 150-152 designate bubbles in said liquid layers, reference numerals 153-155 denote protective films formed of a transparent dielectric material such as $SiO_2$, and reference numerals 156-158 designate transparent electrode layers including transparent heaters 159a, 159b, 160a, 160b, 161a, 161b therein.

The incident light beam enters from the direction of arrow and is transmitted through the interior of the element and emerges to the rear of the element. To improve the transmission efficiency of the light beam, it is preferable that the thickness of the liquid layers 147-149 be smaller than the diameter of the bubbles and the bubbles be in intimate contact with the upper and lower boundary surfaces. To cause the bubbles to be transferred between the light-intercepting portion and the light beam transmitting portion, the transparent heaters 159a-161b below the bubbles may be supplied with power to generate heat and the switching thereof may be effected, but the principle of the transfer and the method of driving the transparent heaters have already been described in detail and therefore need not be described here.

A method of obtaining a desired color light beam by the use of this light control element will now be described by reference to the drawings. For example, to obtain a blue light by the use of the element of the present embodiment, the bubble 152 is transferred to the light beam transmitting portion and the other bubbles 150 and 151 are caused to stay below the light-intercepting filters and a white light is caused to enter. The white light is not absorbed in the portion wherein the bubble 152 exists but is intactly transmitted therethrough, whereas red and green lights are absorbed in the portions of the liquids 147 and 148 and therefore, the emergent light beam is colored in blue. In this manner, one, two or three bubbles are transferred to the color filter portion at a time to mix colors, whereby a light beam of any desired color can be created. Further, if the previously described method of controlling the quantity of light for each of the colors C, M and Y is combined with this method, there can be obtained a color light beam having any desired hue and intensity.

The present embodiment is of a construction in which the mechanisms for producing three colors C, M and Y are layered in succession and therefore, as compared with the embodiments of FIGS. 27 and 30, it has an advantage that the density per picture element can be made high. The driving circuit of the element can be achieved by a technique similar to that shown in FIG. 29 and therefore need not be described.

Figure 33:
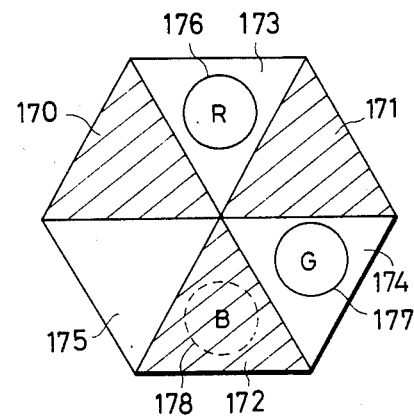

FIG. 33 is a plan view of still another embodiment of the light control element for obtaining a color light beam. In FIG. 33, reference numerals 170-172 designate light-intercepting filters, reference numerals 173-175 denote color filters of red (R), green (G) and blue (B), respectively, and reference numerals 176-178 designate bubbles. The bubbles 176-178 can respectively be transferred between the light-intercepting filters corresponding to the respective colors and the color filters. The principle of the transfer, the structure of the element for each color and the driving method are similar to those in the embodiment of FIG. 27. The difference of the present embodiment from the embodiment of FIG. 27 is that the arrangement of the element in the plane is hexagonal as shown. Where the element of the embodiment of FIG. 27 is two-dimensionally arranged so as to be used, for example, as a display device, there is a possibility that the resolution differs between the longitudinal direction and the lateral direction, whereas the element of the present embodiment is symmetrical in the longitudinal, lateral and oblique directions and therefore, it is easy to obtain a uniform resolution irrespective of the directions. The method of obtaining a color light beam by the use of the element of the present embodiment is similar to that described in connection with the embodiment of FIG. 27 and therefore need not be described.

Figure 34:
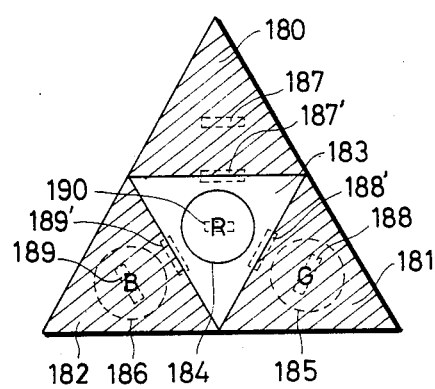

FIGS. 34 and 35A-35F illustrate yet still another embodiment of the light control element for obtaining a color light beam. FIG. 34 is a plan view showing a picture element of the light control element for a colored image. Reference numerals 180-182 designate light-intercepting filters, reference numeral 183 denotes a light beam incidence portion, reference numerals 184-186 designate granular members colored in red (R), green (G) and blue (B), respectively, and reference numerals 187, 187'-189, 189', 190 denote heaters installed below the liquid for holding the granular members. The present element differs only in arrangement in the plane from the embodiment of FIG. 30 and is entirely identical in basic structure to the embodiment of FIG. 30. That is, the liquid for holding the granular members is colorless and transparent and it is to be understood that a light-reflecting layer exists below this liquid. It is also to be understood that the light beam is a white light and enters the light beam incidence position 183 from a direction perpendicular to the plane of the drawing sheet.

Figure 35A:
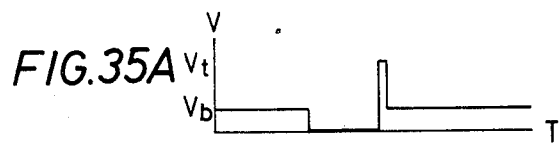
Figure 35B:
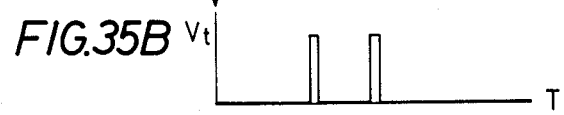
Figure 35C:
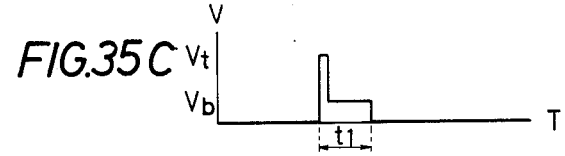
Figure 35D:
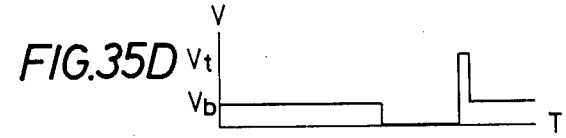
Figure 35E:
Figure 35F:
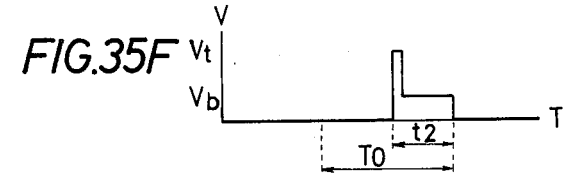

A method of obtaining a color light beam of any desired color tone will now be described by reference to FIGS. 35A-35F. In these Figures, the vertical axis represents the voltage V applied to each heater and the horizontal axis represents time T. FIG. 35A shows the state of the voltage applied to the heater 187, FIG. 35B shows the state of the voltage applied to the heater 187', FIG. 35C shows the state of the voltage applied to the heater 190, FIG. 35D shows the state of the voltage applied to the heater 188, FIG. 35E shows the state of the voltage applied to the heater 188', and FIG. 35F shows the state of the voltage applied to the heater 190. FIGS. 35A-35F also show the process in which a yellow light is produced by color subtraction and mixing of R and G. First, in the initial state, each granular member is in the light-intercepting filter and stays on the heaters 187, 188 due to a bias voltage Vb (FIGS. 35A and 35D) applied to the heater below the light-intercepting filter. Next, the bias voltage of the heater 187 below the red granular member 814 becomes 0 and a voltage Vt higher than Vb is applied to the heater 187' (FIG. 35B), so that the granular member 184 moves onto the heater 187'. At the next moment, the voltage Vt becomes 0 and instead, the voltage Vt is applied to the central heater 190, so that the granular member 184 moves onto the heater 190 (FIG. 35C). After the movement of this granular member, the voltage of the heater 190 changes into a bias voltage (FIG. 35C) and the granular member 184 is held on this heater. After time $t_1$ has elapsed, the voltage of the heater 190 becomes 0 and the granular member follows the reverse order of heaters 187' and 187 (FIGS. 35B and 35A) and returns onto the heater 187, and is held on this heater. When the granular member 184 has been transferred onto the heater 187, the green granular member 185 is now transferred onto the central heater 190 in a similar process (FIGS. 35D and 35E) and stays on this heater for time $t_2$, whereafter it returns to its initial position (FIGS. 35F, 35E and 35D). If the time required for the above-described process is To and this time To is set to as time sufficiently shorted than, for example, the time response of the human eye, when the element is observed by the naked eye, the light scattered by the red granular member and the green granular member illuminated by the white light will be color-subtracted and mixed and thus will look yellow. In this case, if the ratio between the staying times $t_1$ and $t_2$ of the aforementioned granular members is changed, the hue can be varied in accordance therewith. Likewise, by selecting the combination of the granular members of the respective colors, it will become possible to produce a light beam of any desired color. In addition, the element of the present embodiment, like the embodiment of FIG. 33, has an advantage that when it is two-dimensionally arranged, it can reduce the difference in resolution between directions.

FIG. 36 is a cross-sectional view of yet still another embodiment of the light control element for obtaining a color light beam, and this Figure represents a picture element of the element. In FIG. 36, reference numeral 191 designates a glass plate, reference numerals 192 and 196 denote transparent electrode layers including transparent heaters 193a–193c and 196a–196c, respectively, therein, reference numerals 194 and 195 designate protective films formed of a transparent dielectric material such as $SiO_2$, reference numeral 198 denotes a colored transparent liquid, and reference numerals 197a–197c designate granular members colored in red (R), green (G) and blue (B), respectively. The illuminating light is white and applied in the direction of arrows.

In this embodiment, unlike the previous several embodiments, pairs of upper and lower heaters such as 193a and 196a, . . . are provided and the granular members can be moved vertically between these heaters.

A method of producing a color light beam by the use of this element will now be described by reference to FIG. 36. For example, assuming that, as shown, the granular members of colors R and B are moved to below the liquid 198 by the control of the heaters and only the granular member 197b of color G is attracted upwardly and observed from the incident light beam side, the granular members of colors R and B do not scatter and reflect the incident light beam due to the presence of the colored liquid layer having a concentration and the granular member 197b of color G looks colored in green by scattered light because there is little or no liquid layer between the granular member 197b and the film 194. Likewise, by combining the granular members to be attracted upwardly, there can be obtained scattered lights colored in various colors when the element is observed as a whole picture element.

FIGS. 37A and 37B show an embodiment of the display device to which the above-described light control element is applied, FIG. 37A being a front view and FIG. 37B being a cross-sectional view. In FIGS. 37A and 37B, reference numeral 201 (201a–201g) designates light-transmitting band-like solids, and reference numeral 201' (201'a–201'g) denotes light-intercepting band-like solids arranged in staggered relationship with 201 (201a–201g) to form pairs (201a, 201'a–201g, 201'g). Reference characters 202a–202g designate granular members disposed for the pairs 201a, 201'a–201g, 201'g, respectively, reference numeral 203 denotes a liquid including the granular members 202 therein, reference characters 204a–204g designate transparent heaters disposed in opposed relationship with the light-transmitting band-like solids 201a–201g, respectively, and reference characters 204'a–204'g denote heaters disposed in opposed relationship with the light-intercepting band-like solids 201'a–201'g, respectively. These heaters can be driven independently of one another. Reference numeral 205 designates an insulative transparent solid layer including the heaters 204 and 204' therein, and reference numeral 206 denotes a surface light-emitting type light source adjacent to the insulative transparent solid layer 205. The light source 206 may be, for example, ELP (electro-luminescent panel) or the like.

Operation of the present embodiment will now be described. In a picture element which it is desired to display, the heaters 204 are caused to generate heat, and in a picture element which it is not desired to display, the heaters 204' are caused to generate heat. Thereupon, the granular members 202 move to the heaters which have generated heat and, when observed from outside, the granular members are disposed only in the picture element which it is desired to display and the other granular members are hidden by the light-intercepting band-like solids 201' and cannot be seen. If the liquid 203 is a liquid having no light-transmitting property, the light from the surface light source 206 will pass only through the granular member portion and therefore only the granular member portion will look luminant. Also, even if the liquid 203 is a light-transmitting liquid, light is scattered by the diffraction, reflection, etc. of light by the granular members and therefore, the granular member portion can be distinguished from the other portions.

The intended display can be accomplished in the above-described manner. In the above-described embodiment, the band-like solids on the surface are long in the horizontal direction, but these may also be long in the vertical direction. Also, in the present embodiment, the surface light source 206 is added to provide a light-emitting type display element, but alternatively, the surface light source may be eliminated to provide a non-light-emitting type element. In this latter case, a form in which a reflecting film is provided between the liquid 203 and the insulating layer 205 is also conceivable and if this is done, the heaters 204 and the insulating layer 205 need not have a light-transmitting property. In the above-described embodiment, transparent bubbles or opaque granular members such as, for example, solid particles can also be used as the granular members. If, in that case, a material having a light-transmitting property is used as the liquid 203, the contrast will become better. Also, in the above-described embodiment, heat-generating resistance members are assumed as the heaters, but in addition to this, for example, a method of squeezing and applying a laser light is conceivable.

FIGS. 38A and 38B show another embodiment using the above-described light control element, FIG. 38A being a general view thereof and FIG. 38B being a cross-sectional view thereof. In FIGS. 38A and 38B, reference characters 211a–211g designate transparent heaters, reference characters 211'a–211'g denote heaters opposed to the transparent heaters 211a–211g, respectively, reference characters 212a–212g designate granular members disposed for the pairs of heaters 211a, 211'a–211g, 211'g, respectively, reference numeral 213 denotes a light-transmitting insulative solid including the heaters 211 therein, reference numeral 213' designates an insulative solid including the heaters 211'therein, and reference numeral 214 denotes an opaque liquid. The heaters 211a–211g and 211'a–211'g can be driven independently of one another.

In the element of such a construction, the forward heaters 211 are caused to generate heat for a picture element which it is desired to display and the rearward heaters 211' are caused to generate heat for a picture element which it is not desired to display. Thereupon, the granular members are attracted to the heaters which have generated heat, but due to the non-light-transmitting property of the liquid 214, the granular members attracted to the heaters 211' cannot be seen from ahead thereof and only the granular members attracted to the heaters 211 can be seen and thus, the granular members are disposed only for the picture elements which it is desired to display. The granular members attracted to the heaters 211 reflect and scatter the indoor light or the like entering from the surface and therefore, there is provided a contrast different from that in the portion wherein the granular members are absent, and the granular member portion can be recognized. Accordingly, the intended figures or characters can be displayed.

In the present embodiment, the granular members may be transparent bubbles or opaque granular members such as, for example, opaque solid particles. Also, in the present embodiment, heat-generating resistance members are assumed as the rearward heaters 211', but in addition to this, a method of squeezing and applying a laser light or the like is conceivable.

FIG. 39 shows an example of the device for driving the embodiment of the present invention, FIG. 39A showing a schematic view of the construction of the driving system, FIG. 39B showing the signal waveforms input to the system of FIG. 39A, and FIG. 39C showing the voltage waveforms applied to the kth pair of heaters. In FIG. 39, reference numeral 220 designates a clock pulse which provides the basis of operation, and reference numeral 221 denotes an image signal which assumes 1 when it is desired to effect display, that is, when it is desired to show the granular members and which assumes 0 when it is not desired to effect display, that is, when it is desired to hide the granular members. The image signal 221 is sent time-sequentially in synchronism with the clock pulse 220. Reference numeral 222 designates a switch element whose contact is adapted to be changed over in synchronism with the clock pulse 220, reference character 223$k$ denotes a voltage generator connected to each terminal of the switch element 222 and connected to the kth terminal, and reference characters 224$k$ and 224'$k$ designate the kth pair of heaters in the embodiment of the present invention, one end of each of the heaters 224$k$ and 224'$k$ being connected to the output of the voltage generator 223$k$ and the other end being grounded. The granular members may be seen when the heater 224$k$ is caused to generate heat and attracts the granular members, and may not be seen when the heater 224'$k$ is caused to generate heat and attracts the granular members. Reference characters 225$k$ and 225'$k$ denote the two output voltage waveforms from the voltage generator 223 which are applied to the heaters 224$k$ and 224'$k$, respectively.

The function of the kth voltage generator 223$k$ will now be described. When this voltage generator is selected by the switch element 222, the current image signal is compared with the stored previous image signal in synchronism with the clock pulse 220 and if they are identical, the voltage generator continues a condition in which it holds the current voltage and, if they differ from each other, the voltage generator effects the operation of changing over the two output voltages. The normal output voltages (Vh of 225$k$ and 225$k'$) is of a value which can continue the holding of the granular members. When the two output voltages are changed over, as regards the voltage which drops, the voltage Vh intactly changes to a 0 voltage, but as regards the voltage which rises, if once rises from 0 to a voltage Vt ($>$Vh) and this continues for a time $\tau$, whereafter it drops to Vh and is hold thereat. Vt and $\tau$ are set to the values necessary to move the granular members. The value of the current image signal is stored until the voltage generator 223$k$ is selected next time.

Operation of the driving device will now be described by reference to FIGS. 39B and 39C. Adjacent picture elements (pairs of heaters) are successively selected by the switch element 222 at each period of the clock pulse 220 of FIG. 39B, and the image signal 221 is sent in a form corresponding thereto. For example, the meaning of the image signal 221 in the example of FIG. 39B is that the granular member is visible to the (k-2)th picture element, the granular member is invisible to the (k-1)th picture element, the granular member is visible to the kth and the (k+1)th picture element and the granular member is invisible to the (k+2)th picture element. In FIG. 39C, reference characters 225$k$ and 225'$k$ represent the situation of the voltage applied to the kth pair of heaters or put out from the kth voltage generator, and at a certain time t=To (for example, the falling of the clock pulse) during the period of one clock in which the kth pair of heaters (or the kth voltage generator) is selected by the switch 222, the above-described operation of the voltage generator 223$k$ takes place. The shown example shows the variation in the voltage applied to the heaters when the signal which has so far been 0 (the granular member is invisible) changes over to 1 (the granular member is visible). Due to this variation in the voltage, the granular member so far held by the heater 224'$k$ moves to the heater 224$k$ and is held thereby until the kth pair of heaters are again selected. In the next clock, the contact of the switch element 222 is changed over and the neighboring pair of heaters (224$k$+1, 224'$k$+1) are selected and a similar operation takes place. When the clock shifts and the last pair of heaters are selected, change-over to the first pair of heaters takes place again after a certain time. When the kth pair of heaters are again selected, if a signal (0) different from the current image signal (1) is input to the voltage generator, the applied voltages 225$k$ and 225'$k$ will be again changed over.

Thus, if the driving device of the construction as shown in FIG. 39 is used, any desired image display can be accomplished by converting the image to be displayed into an image signal and inputting the same.

Figure 40:
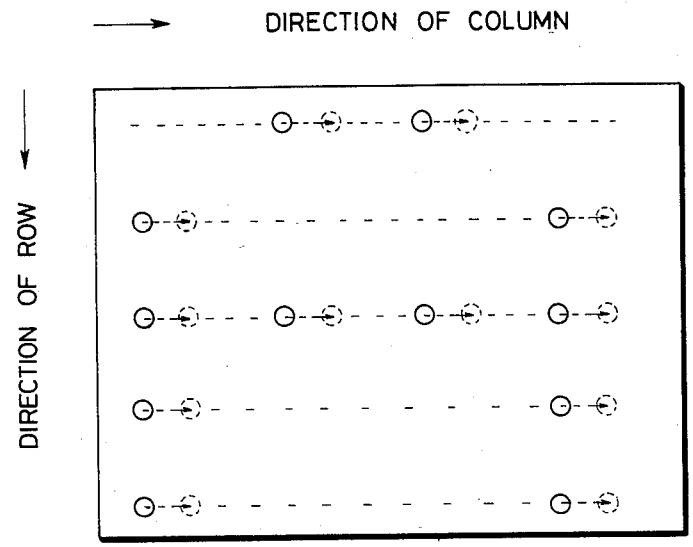
Figure 41:
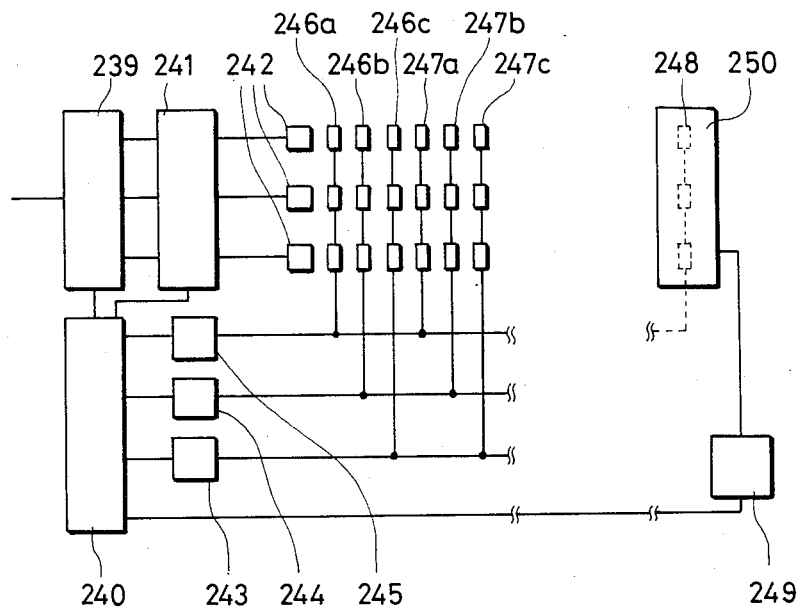

FIGS. 40 and 41 show another embodiment in which the light control element for moving granular members in one direction as described in connection with FIG. 18 is used for the purpose of display.

First, the plan view of FIG. 40 shows the manner in which the granular members existing in the same column are moved to the adjacent column at a time by a construction in which heat-generating resistance members are arranged in rows and columns. In FIG. 40, the principle of movement of the granular members between columns and the driving method are the same as those shown in FIG. 18. Accordingly, in FIG. 40, the granular members belonging to the same column move to the adjacent column at a time. That is, the alphabetical lett "A" expressed by the granular member indicated by a solid-line circular mark moves while expressing the letter "A" at the next moment, as indicated by a broken-like circular mark.

FIG. 41 shows the basic type of the driving circuit for realizing the apparatus and the driving method shown in FIGS. 18 and 40. In this Figure, bubbles are mentioned as an example of the moving granular members. The image signal information (for example, the video signal or the like) from a signal source, not shown, is temporally stored in a memory 239 by an amount corresponding to one column. Thereafter, on the basis of the timing pulse from a synchronizing circuit 240, a driving circuit 241 for heat-generating resistance members for creating bubbles drives the heat-generating resistance members 242 for creating bubbles, in accordance with the information signal, thereby creating bubbles and actualizing the information signals corresponding to one column. Next, the synchronizing circuit 240 imparts a timing pulse to a driving circuit 243 for heat-generating resistance members for transferring the bubbles, and on the basis of the signal from the driging circuit 243, the column 246a of heat-generating resistance members for transferring the bubbles generates heat to such a degree that new bubbles are not created and simultaneously therewith, the heat-generating resistance members 242 step generating heat. Accordingly, a temperature gradient occurs between the heat-generating resistance members 242 and 246a in the liquid and as a result, the bubbles move to the column 246a of resistance members. Thereafter, driving circuits 244, 245 and 243 for heat-generating resistance members for transferring the bubbles are successively driven on the basis of the timing pulse from the synchronizing circuit 240, whereby columns 246b, 247b, ..., 246c, 247c, ..., 246a, 247a, ... of heat-generating resistance members for transferring the bubbles are successively caused to generate heat, thus enabling the bubbles to be transferred. Also, the driving circuit 241 for heat-generating resistance members for creating the bubbles can be driven simultaneously with the driving circuit 245 for heat-generating resistance members for transferring the bubbles. The bubbles which have moved to the last column 248 of heat-generating resistance members for transferring the bubbles existing outside the area in which control of the incident light beam is effected are cooled and extinguished by the signal from a cooling device driving circuit 249, for example, by a cooling device comprising a Peltier element, on the basis of the timing pulse from the synchronizing circuit 240.

As another form of the method of extinguishing the bubbles which have moved to the last column, it is possible to move the bubbles to a bubble collecting device, not shown by the use of the moving method based on the principle described in the present embodiment, and thereafter cause the bubbles to be naturally extinguished, or to remove the bubbles by utilization of buoyancy or the like. Further, where solid granular members are used, a form is possible in which the collecting device is caused to also have the function of heat-generating resistance members for creating bubbles, that is, the collecting device is provided with the starting point and terminal of the column of heat-generating resistance members for moving the bubbles, whereby the granular members are circulated.

The driving system for moving the granular members corresponding to one column at a time in one direction as described in connection with FIG. 41 has the following advantages.

Firstly, in the driving system shown in the present embodiment, the heat-generating resistance members in the same column are driven at a time and therefore, the heat-generating resistance members in the same column can be series-connected. To form the above-mentioned heat-generating resistance members, the IC manufacturing technique is usually used, and in the manufacture of the mask pattern thereof, there is an advantage that particularly the shape of the electrode portion is simplified and accordingly, designing becomes easy.

Secondly, the burden of the driving circuit may be reduced by driving the heat-generating resistance members corresponding to one column at a time. That is, if each of the heat-generating resistance members arranged in rows and column is independently driven, driving circuits corresponding to at least three columns will be required, whereas according to the present system, driving can be simply accomplished by a driving circuit basically corresponding to three columns.

As described above, according to the present embodiment, simplification of the construction of the apparatus becomes possible on the basis of the novel principle of movement of granular members and by adopting the system wherein, of the heat-generating resistance members arranged in rows and columns, those which exist in the same column are driven at a time.

Figure 42:
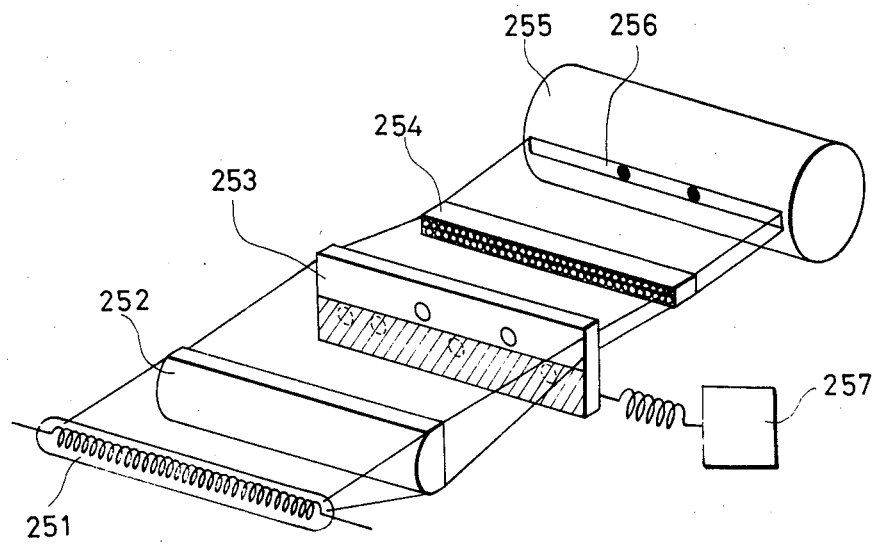
FIGS. 42, 43 and 44 show embodiments of the recording apparatus to which the light control element is applied.

FIG. 42 shows an embodiment of the optical recording apparatus using the above-described light control element. In FIG. 42, reference numeral 251 designates a linear light source, reference numeral 252 denotes a cylindrical lens for collimating the light from the linear light source 251, and reference numeral 253 designates a light control element as an optical shutter array, the light control element 253 being provided with a light-intercepting portion for hiding granular members. Reference numeral 254 denotes an index gradient type lens array for imaging the light control element 253 on a photosensitive drum 255, reference numeral 256 designates the image of the light control element 253 formed on the photosensitive drum 255, and reference numeral 257 denotes a driving device for the light control element 253.

In FIG. 42, the light emitted from the linear light source 251 is made into a substantially parallel light beam by the cylindrical lens 252 and enters the light control element 253. The light transmitted through the light-transmitting portion of the light control element 253 passes through the index gradient type lens array 254 and forms the image 256 of the light control element 253 on the photosensitive drum 255. If the light control element 253 is one which uses an opaque liquid and bubbles, only the portions of the image 256 which correspond to the bubbles in the light-transmitting portion of the light control element will be light, and conversely, if the light control element 253 is one which uses a transparent liquid and bubbles or a transparent liquid and opaque granular members, the portions of the image 256 which correspond to the granular members will be dark.

In the above-described embodiment, a light control element of the type which is used by transmitting light therethrough is assumed as the light control element 253, but use may equally be made of a light control element of the type which is used by reflecting light by a reflecting film or a light control element of the type in which bubbles in an opaque liquid are moved in the direction of travel of light and the difference in the reflected state of light resulting from the presence or absence of the bubbles on the surface is utilized (this latter type eliminates the necessity of providing a light-intercepting portion). In that case, such an arrangement will be adapted that the light reflected by the light control element 253 is received by the index gradient type lens array 254 and the image 256 of the light control element 253 is formed on the photosensitive drum 255.

As the driving device 257 in the present embodiment, use is made of the previously described driving device (shown in FIG. 14) comprising array elements arranged in a row.

Figure 43:
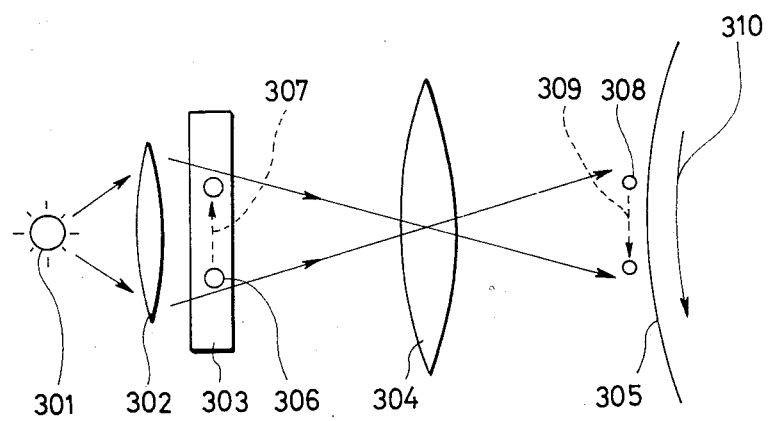
Figure 44:
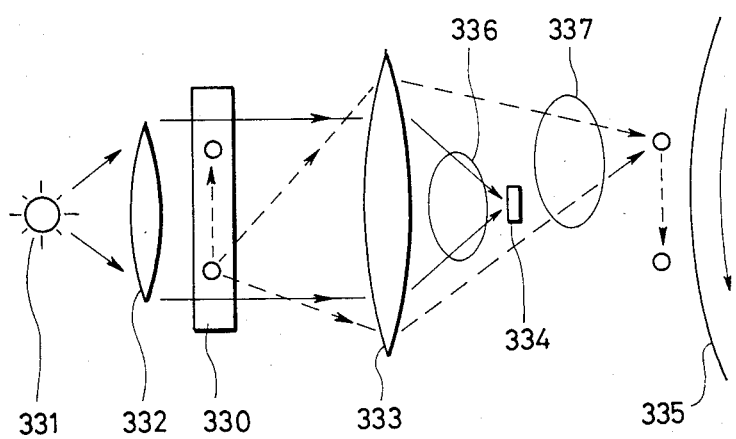

FIGS. 43 and 44 schematically show embodiments of the recording apparatus using the light control element utilizing the driving system for moving granular members in one direction as shown in FIGS. 18, 40 and 41.

The light control system of the light control element 303 used in the recording apparatus of FIG. 43 is the same as the light control system of the element shown in FIG. 7, and the liquid layer has the function of absorbing the incident light beam. Accordingly, of the light beam entering the light control element 303, only the light beam having entered the area in which a bubble which is a granular member exists passes through the light control element. In FIG. 43, the light beam from a light source 301 is converged by a condenser lens 312 and enters the light control element 303. This light control element 303, as described above, passes therethrough only the light beam which has entered the area in which the granular member 306 exists. Also, in this light control element 303, as already described, the granular member 306 is driven so as to transfer the information in one direction. A projection optical system 304 for keeping the light control element 303 and a photosensitive medium 305 at optically conjugate positions is disposed at a place whereat the light beam emerges from the light control element 303, and accordingly, the position of the granular member 306 in the light control element 303 is projected as a projected image 308 onto the surface of the photosensitive medium 305. In the light control element 303, a plurality of granular members 306 are disposed in a direction perpendicular to the plane of the drawing sheet and accordingly, the light beams passing through these granular members enter various regions of the photosensitive medium 305 in the lengthwise direction thereof (the direction perpendicular to the plane of the drawing sheet). Thereafter, recording on plain paper or the like is possible through the steps of development, transfer, fixation, etc. used in the ordinary copying apparatus or the like.

A feature of the optical recording apparatus shown in FIG. 43 is that the movement speed of the granular members in the light control element 303 is synchronized with the movement speed of the photosensitive medium 305. That is, in FIG. 43, when the granular member 306 in the light control element 303 moves at a speed v in the direction of arrow 307, the projected image 308 of the granular member by the projection optical system 304 moves at a speed $\beta \cdot v$ in the direction of arrow 309. ($\beta$ is the lateral magnification of the projection optical system.) When the photosensitive medium 305 is moved in the direction of arrow 310 so that the surface speed thereof becomes equal to $\beta \cdot v$, the projected image 308 of a certain granular member 306 is written onto a corresponding point on the photosensitive medium 305 for the time during which the granular member 306 exists in the effective area of the light control element 303. Accordingly, the exposure amount onto the photosensitive medium 305 assumes a value resulting from the time during which the granular member 306 exists in the effective area being integrated by the quantity of transmitted light per unit time by the transmittivity of the granular member 306 and thus, remarkable improvement of the exposure amount is possible. This in turn can greatly contribute to the enhancement of the recording speed and the reduction in the power consumption of the light source 311.

The light control system of the light control element used in the recording apparatus shown in FIG. 44 is the same as the light control system of the element shown in FIG. 6. That is, the incident light beam entering the position at which a granular member exists is refracted and reflected on the surface of the granular member and passes as a divergent light through the light control element. On the other hand, the light beam which has entered the area in which no granular member exists is affected in no way and passes through the light control element. In FIG. 44, the light beam from a light source 331 is collimated by a collimeter lens 332 and enters the light control element 330. The light beam 336 which has passed through the portion of the light control element 330 in which no granular member exists is condensed on a light-intercepting filter 334 by a projection lens 333 and intercepted. On the other hand, the divergent light beam which has passed through the position at which the granular member exists is projected onto a photosensitive medium 335 by a projection lens 333. That is, the projection lens 333 and the light-intercepting filter 334 together form a Schlieren optical system. As regards the movement of the granular member, the movement of the image of the granular member and the movement of the photosensitive medium, the present apparatus is the same as the apparatus shown in FIG. 43. Also, in the apparatus shown in FIG. 44, as in the apparatus shown in FIG. 43, a plurality of granular members are disposed in a direction orthogonal to the plane of the drawing sheet. Accordingly, the apparatus shown in FIG. 44 has just the same effect as that of the apparatus shown in FIG. 43.

While a transmission type light control element is used in the apparatuses shown in FIGS. 43 and 44, a reflection type light control element may also be used.

In the embodiments shown in FIGS. 43 and 44, description has been made of the optical recording apparatus using the novel principle of movement of granular members. In the optical recording apparatuses shown in these embodiments, the granular members having the light controlling function are successively transferred at a time in the direction of row by an amount corresponding to one column and the photosensitive medium is moved in synchronism with the movement of the projected image of this column of granular members, whereby it is possible to increase the exposure amount onto the photosensitive medium.

Figure 45:
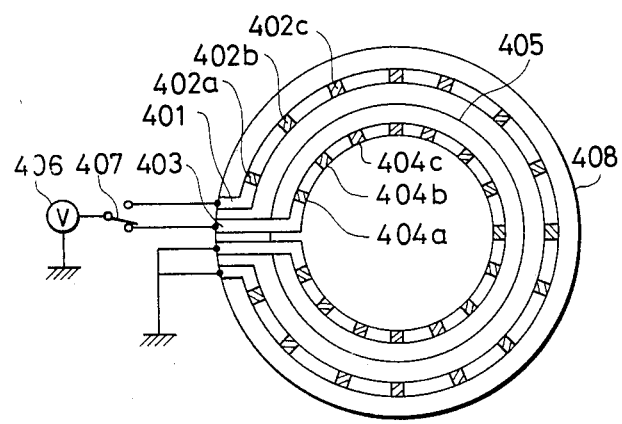
FIGS. 45 and 46 show an embodiment of the variable aberration imaging optical system to which the light control element is applied.

FIG. 45 shows an embodiment in which the above-described light control element is used as a soft focus filter used in a photographic lens or the like. In FIG. 45, reference numeral 408 designates a glass substrate on which ring-like electrodes 401 and 403 are disposed concentrically. Heat-generating resistance members 402a, 402b, 402c, . . . and 404a, 404b, 404c, . . . are disposed substantially at equal intervals on these electrodes, respectively, the number of heat-generating resistance members 402 being equal to the number of heat-generating resistance members 404. It is to be understood that at least the electrode 403 and the heat-generating resistance members 404 are formed of transparent substances. Reference numeral 405 designates the light ray effective portion of a photographic lens, as will later be described. This light ray effective portion refers to an area through which a light ray contributing to the imaging passes. The ring-like electrode 401 lies outside the effective portion, while the ring-like electrode 403 lies inside the effective portion. One of the ring-like electrodes 401 and 403 is selected by a switch 407. One end of the selected electrode is kept at a predetermined potential and the other end thereof is grounded. As a result, the heat-generating resistance members on the selected electrode generate heat. For example, in a first state in which the electrode 401 has been selected, granular members such as bubbles are positioned on the heat-generating resistance members 402a, 402b, 402c, . . . . Next, in a second state in which the electrode 403 has been selected by changing over the switch 407, the granular members are transferred toward the center in such a manner that the granular member on the heat-generating resistance member 402a moves onto the heat-generating resistance member 404a and the granular member on the heat-generating resistance member 402b moves onto the heat-generating resistance member 404b, and as a result, all of the granular members move to the vicinity of the heat-generating resistance members 404 on the inner electrode 403.

Figure 46:
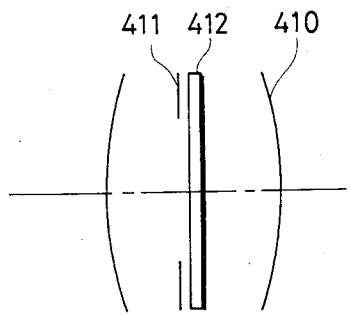

FIG. 46 is a schematic view showing a condition in which the soft focus filter whose operation has been described by reference to FIG. 45 is incorporated into an image pickup optical system. Reference numeral 410 designates an image pickup optical system, reference numeral 411 denotes a stop, and reference numeral 412 designates the soft focus filter described in connection with FIG. 45. This filter is installed near the stop 411 and, as previously described, has the function of moving granular members into the light ray effective portion by changeover of the switch and causing the granular members to be arranged substantially at equal intervals near the circumference of the stop. When the granular members lie outside the light ray effective portion, the resolving power of the image pickup optical system 410 is normal because the electrodes, heaters, etc. are transparent. On the other hand, when the granular members are moved, the light ray of the incident light beam which is heigh in the height of incidence onto the pupil is subjected to a phase variation by absorption, scattering, etc. and therefore, only the portion of spherical aberration which is high in the height of incidence is affected and a flare-like abberation is created. Accordingly, when used as the soft focus filter of the image pickup optical system, the present filter can create an effect such as the control of depiction. The present embodiment, for simplicity of description, has been shown with respect to a case where a single row or ringlike transparent heat-generating resistance members is provided in the light ray effective portion, but if a plurality of rows of heat-generating resistance members are arranged concentrically to control the position and number of the granular members, control corresponding to a variation in diameter of the stop can be accomplished and in addition, the soft focus filter can be utilized as a filter having a complication effect and can be endowed with the function of a filter for controlling the MTF value of the image pickup optical system. The arrangement pattern of the heat-generating resistance members need not always be ring-like, but by choosing the arrangement thereof and the kind of the granular members in conformity with the intended purpose, the application of the present filter as an image improving filter such as an amplitude filter or a phase filter will also be possible.

Figure 47:
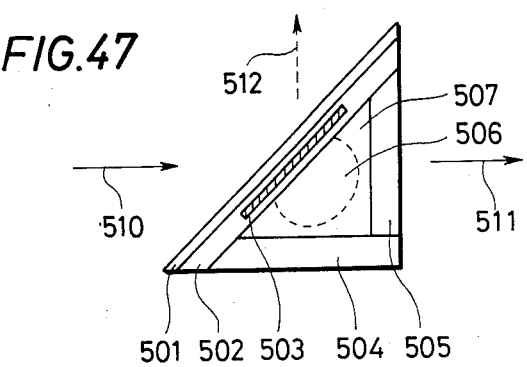
FIGS. 47, 48 and 49 show an embodiment of the optical switching apparatus to which the light control element is applied.

FIG. 47 is a cross-sectional view of an embodiment in which the above-described light control element is used as an optical switching element. In FIG. 47, reference numeral 501 designates a backup member, reference numeral 502 denotes a heat-conductive insulating member in which heat-generating resistance members 503 are embedded, and reference numerals 504 and 505 designate structures formed of glass. The heat-generating resistance members 503 which can be driven independently of one another are disposed in a direction perpendicular to the plane of the drawing sheet. By selectively applying a driving voltage to the heat-generating resistance members, a bubble 506 moves in a liquid layer 507. When the bubble 506 does not exist in the optical path, the incident light 510 to the element becomes a rectilinearly travelling transmitted light 511, and when the bubble 506 exists in the optical path, the incident light 510 is totally reflected in the boundary surface between the insulating member 502 and the bubble 506 and becomes a totally reflected light 512. That is, due to the presence or absence of the bubble 506 in the optical path, the incident light 510 is switched in two different directions.

Figure 48:
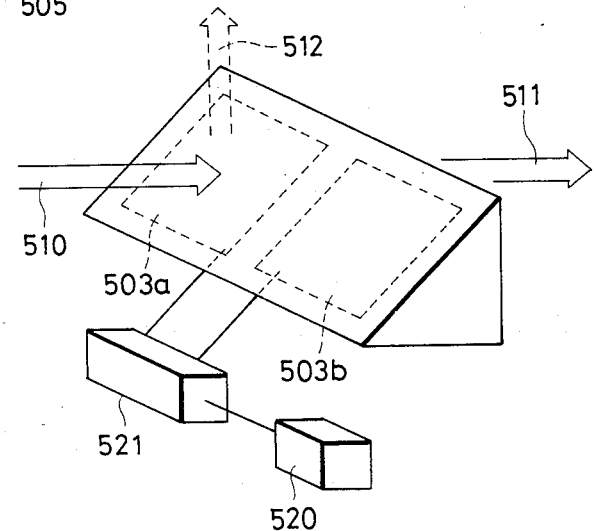

FIG. 48 schematically shows the driving circuit of the light control element shown in FIG. 47. By the signal from a switching signal generating device 520, a heat-generating resistance member driving circuit 521 selects a heat-generating resistance member 503a or 503b to which a voltage is to be applied and applies a voltage thereto, as a result of which the bubble moves to a predetermined position. Thus, as described by reference to FIG. 47, the incident light 510 has its optical path changed over to one of the transmitted light 511 and the reflected light 512.

Figure 49:
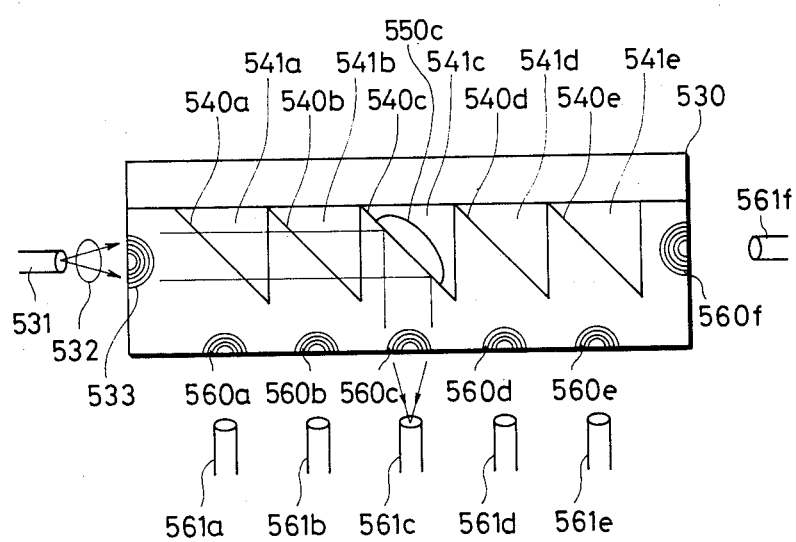

FIG. 49 shows an embodiment in which a plurality of optical devices described by reference to FIGS. 47 and 48 are serially disposed in the direction of travel of light and used as a switching array 530. In FIG. 49, within individual elements, a bubble 550 moves in liquid layers 541 in a direction perpendicular to the plane of the drawing sheet. In FIG. 49, the incident light 532 from the end face of an optical fiber 531 for incident light is collimated by a planar microlens 533 provided on the end face of the array 530 and travels rectilinearly. No bubble exists in the optical paths within the liquid layers 541a and 541b and therefore, the incident light 532 travels rectilinearly. On the other hand, a bubble 550c exists in the optical path within the liquid layer 541c and therefore, the light ray is totally reflected by the boundary layer on the surface of the bubble 550c and is directed to an optical fiber 561c for emergent light by a planar microlens 560c. That is, by selecting and controlling the position of the bubbles 550 in the liquid layers 541, it is possible to select the optical fiber 561 for emergent light.

The embodiments described by reference to FIGS. 47 to 49 are featurized in that movement of bubbles is effected to effect the modulation and switching of light. For example, in U.S. Pat. No. 3,612,653, the switching of light is accomplished by utilizing the creation and extinction of vapor bubbles brought about by heating and cooling a liquid. However, the consumed power necessary to move bubbles in the liquid layer is about 1/10 of the consumed power necessary to create bubbles and accordingly, where elements are made into an array or a matrix and those elements are driven at a time, the embodiment of the present invention is greatly superior to the aforementioned U.S. Patent from the view-point of low power consumption. Further, the embodiment of the present invention is also superior to the aforementioned prior art in the durability of the elements. That is, when a bubble created and growin in a liquid becomes extinct, a high pressure is locally created near the bubble. Accordingly, by the creation and extinction of the bubble being repeated, the heat-generating resistance member becomes liable to destroy the cavitation and this offers a problem in practice. In the embodiment of the present invention, however, as can be understood from the above-described operational principle, no high pressure is created in the liquid layer and this leads to remarkably improved durability.

Description will now be described of an embodiment in which the above-described light control element is applied to an optical information processing apparatus.

Figure 50:
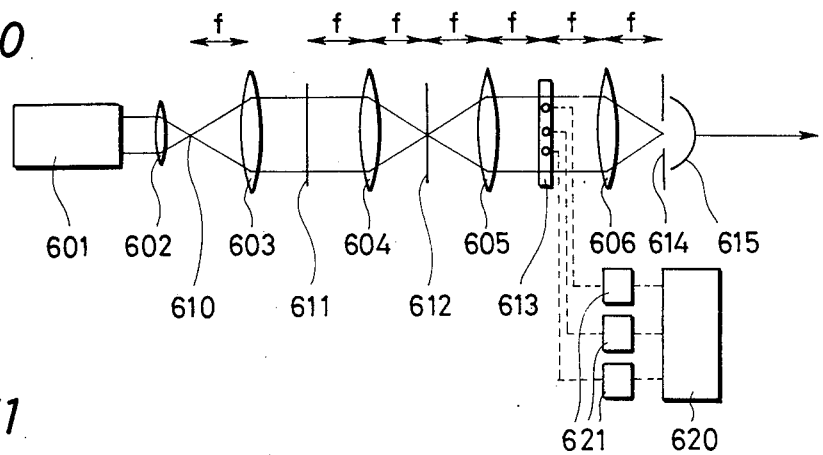
FIGS. 50, 51 and 52 show an embodiment of the optical information processing apparatus to which the light control element is applied.

The embodiment shown in FIG. 50 is an incoherent matched filting apparatus and it is featurized in that the light control element is used as a variable matched filter. In FIG. 50, the light beam from a laser 601 is once condensed at a point 610 by an optical system 602, and then is collimated by an optical system 603 whose forward focus lies at the point 610. An image 611 to be examined is disposed in the collimated light beam and the forward focus of an optical system 604 is made to coincide with the image 611 to be examined. On the other hand, a diffusing plate 612 is disposed at the position of the rearward focus of the optical system 604. As a result, the composite system comprising the optical systems 603 and 604 functions as a Fourier converting optical system and the Fourier converted image $A_{611}$ of the image 611 to be examined appears on the diffusing plate 612. However, the decisive relation between phase components is eliminated by the diffusing action of the diffusing plate 612 and therefore, to the optical systems subsequent to the diffusing plate 612, the diffusing plate 612 can be regarded as an incoherent body whose intensity distribution is expressed as $|A_{611}|^2$. Next, an optical system 605 is disposed so that the diffusing plate 612 lies at the position of the forward focus thereof and the light control element 613 lies at the position of the rearward focus thereof. Further, an optical system 606 is disposed so that the light control element 613 lies at the position of the forward focus thereof and a light-intercepting plate 614 having an opening at the center thereof lies at the position of the rearward focus thereof. A photoelectric transducing element 615 is disposed rearwardly of the opening of the light-intercepting plate 614. The light control element 613 comprises the granular member moving apparatus of the present invention arranged two-dimensionally, and in each element, the selection of whether the incident light to the apparatus should be transmitted is effected depending on the position at which the granular member exists. The position of the granular member is controlled by a driving signal imparted from a heat-generating resistance member driving circuit 621, on the basis of the signal from a filter pattern generating device 620. Thus, the light control element 613 presents various matched filter patterns by the signal from the filter pattern generating device 620. The matched filtering function will hereinafter be described. Consider a case where a point source of light is at the center of the diffusing plate 612. At this time, a Fourier converted image whose intensity distribution is expressed as $|A_{613}|^2$ appears on the light-intercepting plate 614. That is, the composite system comprising the optical systems 605 and 606 can be regarded as an incoherent imaging system whose point image distribution function is expressed as $|A_{613}|^2$. Accordingly, if the image 611 to be examined is inserted into the shown position, the surface of the diffusing plate 612 can be regarded as the surface of a body whose intensity distribution is expressed as $|A_{611}|^2$, and as a result, the correlated pattern of $|A_{611}|^2$ and $|A_{613}|^2$ appears on the light-intercepting plate 614. Accordingly, by detecting the output from the photoelectric transducing element 615, it is possible to know the degree of the correlation between the image 611 to be examined and the matched filter 613.

By using the light control element as the matched filter, the apparatus shown in FIG. 50 has the following features. In the conventional matched filtering apparatus, matched filters prepared in advance for the image 611 to be examined are successively mechanically interchanged and the correlated value therebetween is examined, whereby the apparatus has been used for the purpose such as character reading. However, in the embodiment shown in FIG. 50, the light control element 613 is kept fixed and in the interior thereof, the position at which the granular member exists is varied, whereby it is possible to make various filter patterns and therefore, the mechanical operating portion is unnecessary and this leads to the possibility of making the apparatus compact and the possibility of enhancing the speed of processing. Further, the optical system shown in FIG. 50 is of the type which examines the correlation between the power spectra $|A_{611}|^2$ and $|A_{613}|^2$ and therefore, originally has the feature that the limitation of the position at which the image is placed is alleviated and in addition, in the present embodiment, rotation of the matched filter pattern about the optic axis or enlargement or reduction of the pattern can be easily accomplished by the signal of the filter pattern generating device. Accordingly, as compared with the prior art, simplification of the operability of the apparatus is possible.

Figure 51:
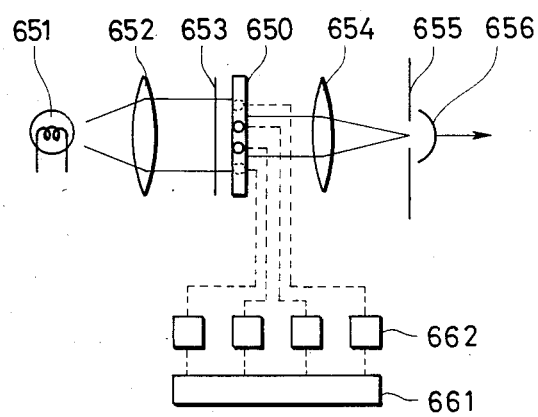

Reference is now had to FIGS. 51 and 52 to describe a further embodiment in which the light control element is applied to an optical information processing apparatus. The technique of convolutionprocessing a uniformly illuminated original image by the use of a composite opening comprising a plurality of openings each having a predetermined transmission factor, thereby accomplishing the processing and modification of the original image is widely known. The present embodiment achieves the above object by making a single light control element correspond to a single opening and controlling the quantity of light transmitted through the opening on the basis of a technique of controlling the quantity of light transmitted through the light control element.

In FIG. 51, the light beam from a light source 651 is made into a substantially uniform distribution of quantity of light by an optical system 652 and illuminates an original image 653. Reference numeral 650 designates a composite opening comprising the above-described light control elements disposed in the form of a two-dimensional matrix. The transmission factor in each element is controlled by a heat-generating resistance member driving circuit 662 on the basis of the signal from an opening pattern generating circuit 661. The control of the transmission factor is accomplished by controlling the ratio of the area of the granular member to the area of the opening or the time during which the granular member exists in the opening within a unit time, and the details thereof have already been described and need not be described here. Reference numeral 654 denotes a condensing optical system for condensing the light beam transmitted through the composite opening 650 on an opening provided on the image plane 655. A photoelectric transducing element 656 produces an electrical signal corresponding to the quantity of condensed light. This electrical signal is the processed image information corresponding to a certain picture element on the original image.

Figure 52A:
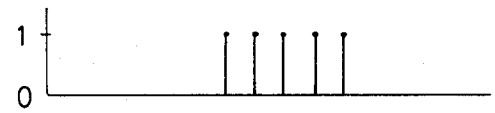
Figure 52B:
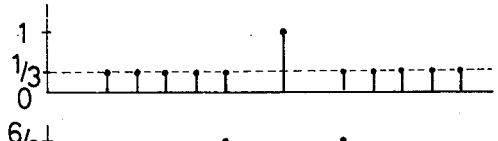
Figure 52C:
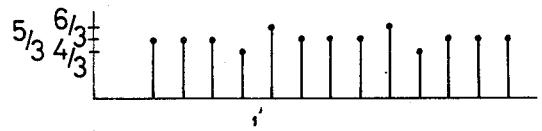
Figure 52D:
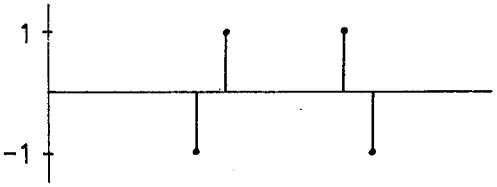

The principle of the optical information processing according to the present embodiment will now be described by the use of a one-dimensional model and by reference ot FIG. 52. FIG. 52A schematically represents the original image 653. The horizontal axis of FIG. 52A represents the position information. The sampling interval is determined by the distance between the adjacent openings in the composite opening 650. The vertical axis of FIG. 52A represents the image information (for example, the transmission factor) at the sample position. For simplicity of illustration, a binary image is displayed. FIG. 52B shows the transmission factor of each opening of the composite opening 650. In FIG. 52B, there is shown an example of the composite opening for one-dimensional Laplacian operation. The transmission factor of each opening is variable between 0 and 1 and therefore, the transmission factor of the middle opening is determined as 1 and the transmission factors of the openings on the opposite sides of the middle opening are determined as 0. The other openings provide a transmission factor of Δ. As a result of making the composite opening shown in FIG. 52B correspond to the original image shown in FIG. 52A, 5/3 (a relative value) is obtained as the output from the photoelectric transducing element 656. Then, the opening pattern shown in FIG. 52B is shifted by an amount corresponding to one picture element by the heat-generating resistance member driving circuit 662 on the basis of the signal from the opening pattern generating circuit 661. By repeating this procedure, convolution operations are accomplished successively. The result of the operation is shown in FIG. 52C. FIG. 52D shows a processed image obtained by subtracting a bias component 5/3 from the result of the operation shown in FIG. 52C, by the use of an operation system, not shown. As a result of the Laplacian processing, the outline of the original image is extracted.

The features of the optical information processing apparatus according to the present embodiment are as follows. By using the light control element as the composite opening for operation, it is possible to freely form twodimensional composite openings corresponding to various operations. Further, the composite openings are of the construction relatively movable on the original image surface by an electrical signal and does not require any mechanical moving mechanism, and this leads to the possibility of enhancing the speed of operation, simplifying the operation and making the apparatus compact. Thus, the optical information processing apparatus according to the present embodiment is one which is of a simple construction as compared with the apparatus of the prior art and yet has versatility.

Figure 53:
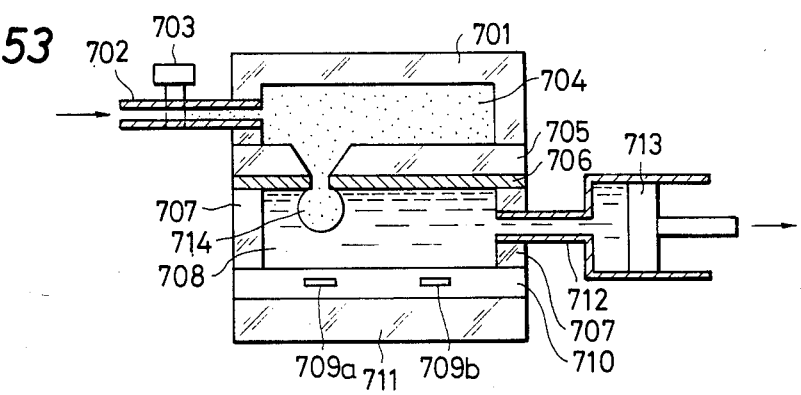
FIGS. 53, 54, 55, 56, 57 and 58 show embodiments of the light control element provided with bubble creating means.

FIG. 53 shows an embodiment of the light control element according to the present invention which is provided with bubble creating means. Reference numeral 701 designates a sealing member for sealing air 704 which is formed of glass or a metal and to which an inlet tube 702 for introducing the air from outside is connected, reference numeral 703 denotes opening-closing means for disconnecting or communicating the air 704 with the extraneous air, reference numeral 705 designates a back-up plate formed of glass or a metal and having an opening in the form of a pin-hole or a slit, reference numeral 706 denotes metal foil having a minute pin-hole at the same location as the opening in the back-up plate, and reference numeral 708 designates a liquid such as water, ethyl alcohol or carbon tetrachloride sealed by a spacer 707 and other member. Reference characters 709a and 709b denote heat-generating resistance members embedded in a layer 710 of insulating material such as $SiO_2$. Reference numeral 711 designates a back-up base plate for the above-described members. The liquid 708 is connected by a connecting tube 712 to pressure converting means 713 which varies the pressure in the liquid.

When the opening-closing means 703 is opened and the pressure in the liquid 708 is reduced by the pressure converting means 713, the air enters the liquid through the pin-hole of the metal foil 706 and a bubble 714 is formed. In this state, the operation of the pressure converting means 713 is stopped and the opening-closing means 703 is closed to disconnect the extraneous air from the internal air 704 and prevent the influence of the extraneous air pressure.

Figure 54:
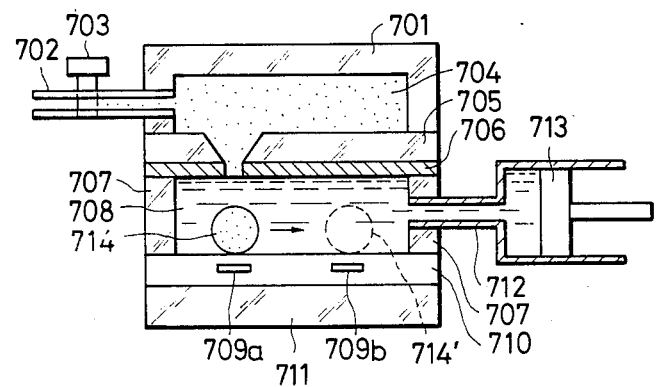

Further, when a voltage is applied to the heat-generating resistance member 709a near the pin-hole of the metal foil, a temperature gradient is created between the liquid near the heat-generating resistance member 709a and the liquid near the pin-hole of the metal foil and, as shown in FIG. 54, the bubble 714 moves to the vicinity of the heat-generating resistance member 709a.

Next, when the voltage applied to the heat-generating resistance member 709a is changed over so as to be applied to the heat-generating resistance member 709b, the bubble 714 moves to the vicinity of the heat-generating resistance member 709b as indicated by broken line 714' in FIG. 54. This movement occurs because, as previously described, a temperature gradient is created between the liquids near the heat-generating resistance members 709a and 709b.

By arbitrarily changing the voltage applied between the heat-generating resistance members 709a and 709b as described above, the bubble 714 becomes movable in accordance therewith.

The bubble 714 created in the above-described manner is not a vapor bubble created by boiling the liquid which is ethyl alcohol, and is not extinguished even if the voltage applied to the heat-generating resistance members 709a and 709b is cut off.

In the above-described embodiment, the diameter of the pin-hole of the metal foil 706 is designed to be an optimum dimension with the surface tension of the liquid used and the desired diameter of the bubble to be created being taken into account and, in the case of the above-described embodiment, where the diameter of the bubble is 10 $\mu$m-200 $\mu$m, the diameter of said pin-hole may suitably be of the order of 1 $\mu$m-10 $\mu$m. That is, if use is made of a pin-hole diameter small relative to the diameter of the bubble, the bubble once formed will never go back to the gas chamber 704 through the pin-hole unless the pressure in the liquid becomes greater than the pressure in the gas chamber 704.

Also, a good combination of the kind of the gas and the kind of the liquid can be chosen with the surface tension, the viscosity, etc. being taken into account. Further, the size of the heat-generating resistance members and the interval between the heat-generating resistance members 709a and 709b are designed in accordance with the size of the bubble and the kind of the liquid. In the case of the above-described embodiment, where ethyl alcohol or carbon tetrachloride is used as the liquid and the diameter of the bubble is of the order of 50 $\mu$m the size of the heat-generating resistance members (for example, $HfB_2$) may preferably be of the order of 10 $\mu$m-50 $\mu$m and the interval therebetween may preferably be 10 $\mu$m-100 $\mu$m.

Figure 55:
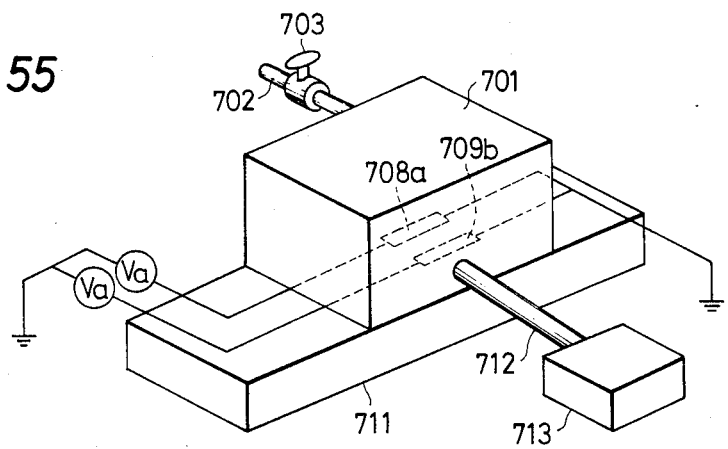

FIG. 55 is a perspective view of the above-described embodiment. As shown in FIG. 55, voltage applying means Va and Vb for applying a voltage to the heat-generating resistance members 709a and 709b are added. The aforedescribed movement of the bubble becomes possible by operating these voltage applying means.

Figure 56:
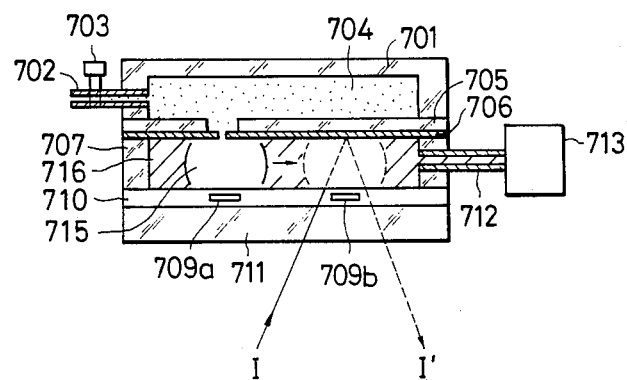

FIG. 56 shows an embodiment in which the bubble created in the above-described manner is moved and the incident light is controlled in accordance therewith. In this embodiment, a water solution of black dye such as Direct Black 19 is used as a liquid 716 and the diameter of the bubble 715 is made greater than the thickness of the liquid layer, and the other members are similar to those in the previous embodiment. The incident light I enters this apparatus and, paying attention only to the vicinity of the heat-generating resistance member 709b, when no bubble is present near the heat-generating resistance member 709b, the incident light is absorbed by the liquid layer. When the applied voltage is changed over to the heat-generating resistance member 709b, the bubble is attracted to the vicinity of the heat-generated resistance member 709b and the incident light passes through the bubble and is reflected by the metal foil 706 and again passes through the bubbles and emerges as indicated by broken line I'.

In this case, the heat-generating resistance member 709b is a material such as indium oxide containing tin having the light-transmitting property and the substrate 711 also is a material such as glass having the light-transmitting property.

By making a structure in which the pin-hole and the heat-generating resistance members 709a, 709b in the cross-section shown in FIG. 56 are arranged in the form of a pair in a direction orthogonal to the plane of the drawing sheet, it becomes possible to realize an optical shutter array which is applicable to an optical printer or the like. Alternatively, by making the arrangement of the above-mentioned pair two-dimensional, the matrix arrangement and movement of the bubble become possible and the application of such arrangement as a display device can also be realized.

Figure 57:
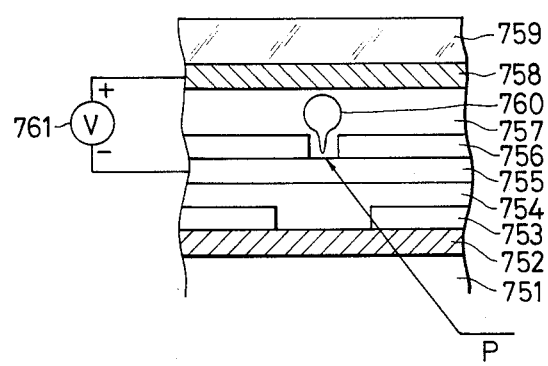

It is possible to use electrolysis as a further technique for creating a bubble in the liquid layer. Examples of the structure of an element are shown in the schematic cross-sectional views of FIGS. 57 and 58. The element shown in FIG. 57 is constructed by successively forming, on an Si substrate 751, a heat-generating resistance member layer 752, an electrode 752 for heat-generating resistance members, an $SiO_2$ insulating layer 754, an electrode 755 for electrolysis, an $SiO_2$ insulating layer 756 covering the other portion of the electrode 755 than the point P at which a bubble is created, a liquid layer 757, an electrode 758 for electrolysis and protective glass 759. The material of the electrodes may be Al, Au, Pt or the like in a case where the electrodes lie at positions whereat they do not intercept the light beam, and the electrodes may be transparent electrodes in the other case. If water be enclosed in the liquid layer 757 and a voltage is applied by a power source 761 so that the electrode 755 may be a cathode and the electrode 789 may be an anode, hydrogen 760 will be produced from the point P. Further, by mixing a support electrolyte such as KBr with the water, it is possible to reduce the applied voltage.

Figure 58:
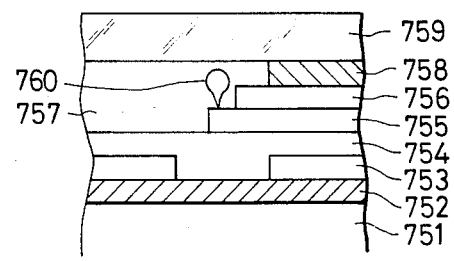

A feature of the structure of the element shown in FIG. 58 is that the electrode 758 is endowed also with the function of a spacer for making the thickness of the liquid layer 757 into a desired value. Where the element shown in FIGS. 57 or 58 is used as a reflection type element, the electrode 755 can be made to serve as a reflecting surface for the incident light by forming this electrode of a metal film. On the other hand, where the element shown in FIGS. 57 or 58 is used as a transmission type element, the Si substrate 751 and the electrodes 755 and 758 may be substituted for by a glass substrate 751 and transparent electrodes 755 and 758.

Figure 59:
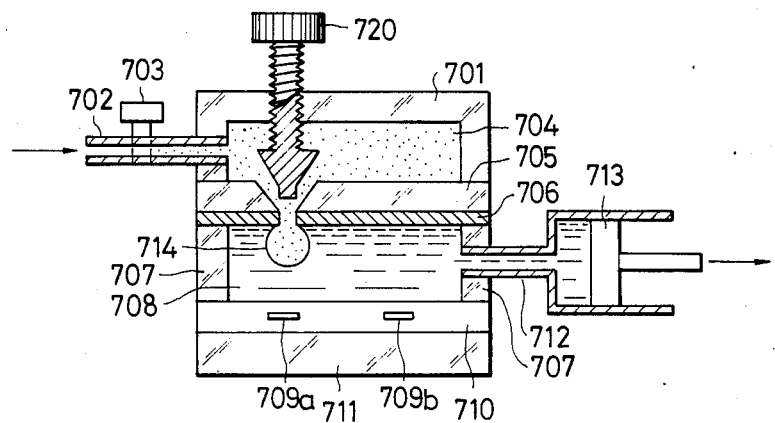
FIGS. 59, 60, 61 and 62 show embodiments of the light control element having a bubble stabilizing structure.
Figure 60:
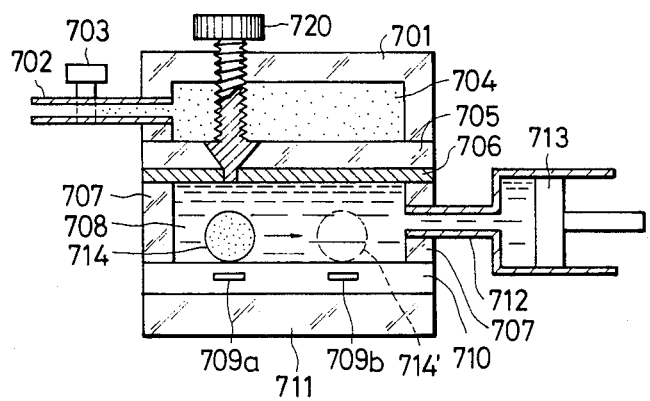

Description will now be made of an embodiment in which the light control element is hermetically sealed to thereby achieve stabilization of a bubble. FIGS. 59 and 60 show an embodiment of the light control element having a structure in which the bubble is sealed. The embodiment shown in FIGS. 59 and 60 is based on the structure of the light control element shown in FIGS. 53 and 54, and in FIGS. 59 and 60, members similar to those shown in FIGS. 53 and 54 are given similar reference numerals and need not be described here. In FIGS. 59 and 60, reference numeral 720 designates a valve for closing the opening portion of a back-up plate 705 after a bubble 714 such as air or the like has been introduced into a liquid 708.

Now, when the opening-closing means 703 and the value 720 are opened and the pressure in the liquid 708 is reduced by pressure converting means 713, gas enters the liquid through the pin-hole of the metal foil 706 and the bubble 714 is formed. In this state, the operation of the pressure converting means 713 is stopped, the opening-closing means 703 and the valve 720 are closed and the liquid 708 and the bubble 714 in this liquid are completely sealed.

Figure 61:
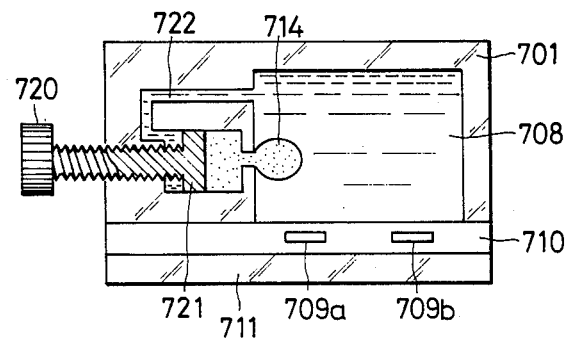
Figure 62:
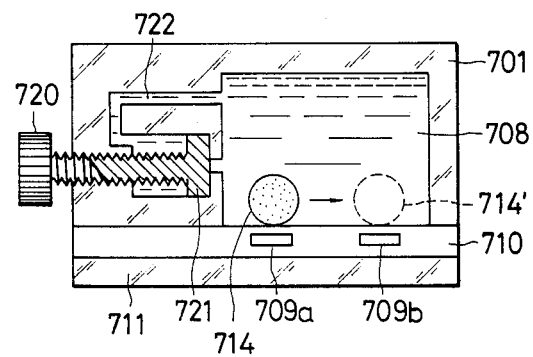

FIGS. 61 and 62 illustrate another embodiment of the light control element according to the present invention which has a bubble sealing structure. In FIGS. 61 and 62, members similar to those in FIG. 59 are given similar reference numerals. The difference of the element of FIGS. 61 and 62 from the element of FIG. 59 is that a structure is adopted in which the liquid 708 can flow rearwardly of the tongue 721 of the valve 720 through a conduit 722.

Now, the valve 720 is advanced to force the gas present forwardly of the tongue 721 thereof into the liquid 708 and thereby form a bubble 714. At this time, the liquid displaced by the bubble fills the rear of the tongue 721 through the conduit 722 and therefore, as a whole, there is no variation in the pressure and moreover, the liquid forward and rearward of the tongue remains completely sealed. The operation thereafter is similar to that of the above-described embodiment and therefore need not be described here. The means for sealing the liquid and the bubble is not limited to the valve as described in the foregoing embodiment, but use may also be made of means such as an adhesive agent or welding.

Figure 63:
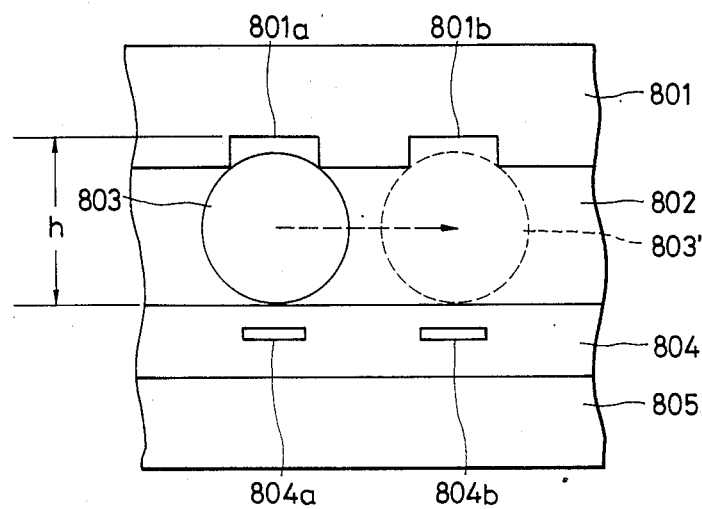
FIGS. 63 and 64 show an embodiment of the light control element having a granular member positioning structure.
Figure 64:
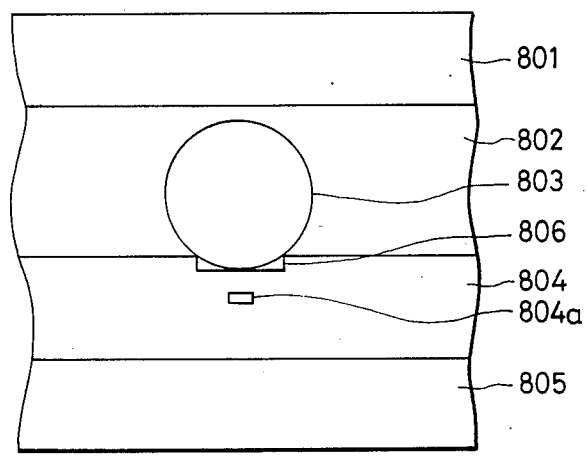

FIGS. 63 and 64 illustrate the structure of the light control element for determining the position of the granular member. FIGS. 63 and 64 show the structure of the element in cross-sections orthogonal to each other. Reference characters 801a and 801b designate concave cut-away portions provided in a protective plate member, reference numeral 802 denotes a liquid medium, reference numeral 803 designates a granular member, reference numeral 804 denotes an insulating layer, and reference characters 804a and 804b designate heat-generating resistance members provided at positions opposed to the cut-away portions 801a and 801b, respectively. Reference number 805 denotes a back-up member, and reference numeral 806 designates a groove formed in the insulating layer 804. Now, consider a condition in which a voltage is applied to the heat-generating resistance member 804a and a voltage is not applied to the heat-generating resistance member 804b and then the voltage applied to the heat-generating resistance member 804a is cut off and a voltage is applied to the heat-generating resistance member 804b. In that case, the granular member 803 existing at the position of the cut-away portion 801a is transferred to the position of the cut-away portion 801b. When the voltage applied to the heat-generating resistance member 804b is cut off, the granular member 803' becomes movable under the influence of buoyancy. However, the granular member 803'has its position determined by the cut-away portion 801b. That is, the drag to the granular member by the cut-away portion acts more greatly than buoyancy and in FIG. 63, movement to right and left is limited. On the other hand, in the direction orthogonal thereto, namely, in FIG. 64, the drag of the groove 806 likewise limits the movement of the granular members 803. In this case, the force acting or the granular member due to the surface tension of the liquid created by the heat-generating resistance members is greater than the drag of the cut-away portions 801a, 801b or the groove 806. It can be realized by choosing the kinds of the protective plate member, the liquid and the insulating layer 804 and by making the depths of the cut-away portions 801a, 801b and the groove 806 into predetermined dimensions. For example, the protective plate member may be formed of glass, the liquid may be ethyl alcohol, the material of the insulating layer may be $SiO_2$, the depths of the cut-away portions 801a, 801b and the groove 806 may be 1 $\mu$m-10 $\mu$m, the thickness h of the liquid layer may be 50 $\mu$m-100 $\mu$m, and a bubble having a diameter equal to or greater than the thickness of the liquid layer may be used as the granular member.

If an element having the structure as described above is used, whatever the inclination of the light control element may be, the granular member will not be moved by buoyancy and the position thereof will not change even if the voltage applied to the heat-generating resistance members is cut off.

In the above-described example, the cut-away portions and the groove are U-shaped, but a similar effect may be obtained even if one or both of them are V-shaped.

What is claimed is:

1. A light control apparatus for controlling an emerging condition of light incident on a light-receiving surface thereof, said apparatus comprising:
   an optical layer provided along the light-receiving surface, said optical layer being composed of liquid;
   a granular member provided in said optical layer, said granular member being adapted to change an optical property of part of said optical layer;
   heating means provided in the vicinity of a predetermined part of said optical layer, the optical property of which is to be changed; and
   means for controlling said heating means, said controlling means controlling said heating means in such a manner that the temperature of said predetermined part is made higher than that of another part of said optical layer so as to move said granular member from said another part to said predetermined part when the optical property of said predetermined part is to be changed, whereby the emerging condition of light incident on said predetermined part is changed due to the change of the optical property thereof.

2. A light control apparatus according to claim 1, wherein said granular member and said liquid are formed of a light-transmitting medium.

3. A light control apparatus according to claim 1, wherein said granular member is formed of a light-transmitting medium and said liquid is formed of a light-intercepting medium.

4. A light control apparatus according to claim 1, wherein said granular member is formed of a light-intercepting medium and said liquid is formed of a light-transmitting medium.

5. A light control apparatus according to claim 1, wherein said granular member is a bubble.

6. A light control apparatus according to claim 1, further comprising means for holding said granular member at a predetermined position in said liquid layer.

7. A light control element for controlling an emerging condition of light incident on a light-receiving surface thereof, said element comprising:
   an optical layer provided along the light-receiving surface, said optical layer being composed of liquid;
   a granular member provided in said optical layer, said granular member being adapted to change an optical property of part of said optical layer;
   first heating means for heating a first portion of said optical layer, said first heating means being disposed in the vicinity of said first portion;
   second heating means for heating a second portion different from said first portion of said optical layer, said second heating means being disposed in the vicinity of said second portion; and light-intercepting means for intercepting a light-beam entering said first portion, wherein said granular member is moved to a higher temperature portion produced by one of said first and second heating means.

8. A light control element according to claim 7, wherein said first heating means and said second heating means are provided at the opposite sides of said liquid layer respectively.

9. A light control element according to claim 7, wherein said first heating means and said second heating means are disposed on the same side with respect to said liquid layer.

10. A light control element according to claim 7, wherein the light beam intercepted by said light-intercepting means in caused to enter said second portion by said light-intercepting means 11. A light control element according to claim 8, wherein said first and second heating means each comprise a heater and means for applying a voltage to said heater, and a first voltage for producing the higher temperature portion and moving said granular member thereto and a second voltage for producing a lower temperature portion and keeping the position of said granular member thereat, the second voltage being smaller than the first voltage, can be selectively applied to each of said heaters.

12. A light control element for controlling an emerging condition of light incident on a light-receiving surface thereof, said element comprising:

an optical layer provided along the light-receiving surface, said optical layer being composed of liquid;

a plurality of granular members disposed in said optical layer, said granular members being adapted to change an optical property of part of said optical layer;

means for restricting the area of said optical layer which is exposed to a light beam; and means for controlling at least one of the number and the distribution state of the granular members existing in said area, said control means comprising a plurality of heating means capable of independently heating a plurality of different locations in said optical layer, said heating means being disposed in the vicinity of the locations, said control means further comprising a heating means driving circuit capable of operating any one of said plurality of heating means, thereby moving said granular member to a higher temperature portion.

13. A light control element according to claim 12, further comprising a color filter, said area being exposed to the light beam which is passed through said color filter.

14. A light control element according to claim 12, wherein said granular member is colored.

15. A light control element according to claim 12, wherein said liquid is colored.

16. A light control element for controlling an emerging condition of light incident on a light-receiving surface thereof, said element comprising:

an optical layer provided along the light-receiving surface, said optical layer being composed of liquid;

a granular member provided in said optical layer, said granular member being adapted to change an optical property of part of said optical layer;

first heating means for heating a first portion of said optical layer, said first heating means being disposed in the vicinity of said first portion;

second heating means for heating a second portion of said optical layer different from said first portion, said second heating means being disposed in the vicinity of said second portion;

means for intercepting a light beam entering said first portion; and means for controlling said first and second heating means and controlling the time during which said granular member stagnates in said second portion by utilizing a characteristic that said granular member tends to move to a higher temperature portion.

17. A light control element according to claim 16, wherein said liquid layer is formed of a non-light-tranmitting medium and said granular member is formed of a light-transmitting medium.

18. A light control element for controlling an emerging condition of light incident on a light-receiving surface thereof, said element comprising:

an optical layer provided along the light-receiving surface, said optical layer being composed of liquid;

a granular member provided in said optical layer, said granular member being adapted to change an optical property of part of said optical layer;

heating means capable of heating a desired location in said optical layer at intervals of short distance as compared with the diameter of said granular member, said heating means being disposed in the vicinity of said location at intervals of said short distance;

heating mean controlling means for controlling said heating means and moving said granular member to a higher temperature location; and means for controlling the area of said granular member which is exposed to a light beam entering said light control element.

19. A light control element according to claim 18, wherein said heating means comprises heat-generating resistance members arranged in a row.

20. A light control element for controlling an emerging condition of light incident on a light-receiving surface thereof, said element comprising:

an optical layer provided along the light-receiving surface, said optical layer being composed of liquid;

a granular member provided in said optical layer, said granular member being adapted to change an optical property of part of said optical layer;

heating means capable of independently heating at least three different locations in said optical layer, said heating means being disposed in the vicinity of said at least three locations; and a heating means driving circuit for driving said heating means and successively heating said locations with time, thereby moving said granular member to a higher temperature location.

21. A light control element for controlling an emerging condition of light incident on a light-receiving surface thereof, said element comprising:

an optical layer provided along the light-receiving surface, said optical layer being composed of liquid;

means for creating a bubble in said optical layer;
heating means capable of independently heating three or more different locations in said optical layer, said heating means being disposed in the vicinity of said locations;
a heating means driving circuit for driving said heating means and successively heating said locations with time, thereby moving said bubble to a higher temperature location; and
means for extinguishing said bubble in said optical layer.

* * * * *

UNITED STATES PATENT AND TRADEMARK OFFICE
CERTIFICATE OF CORRECTION

PATENT NO. : 4,795,243

DATED : January 3, 1989

INVENTOR(S) : Masayuki Suzuki

It is certified that error appears in the above-identified patent and that said Letters Patent is hereby corrected as shown below:

[56] REFERENCES CITED
   Right Column, "Sheridan" should read --Sheridon--.

[56] OTHER PUBLICATIONS
   Right Column, "Sueramanian, R.S." should read --Subramanian, R.S.--.

COLUMN 1
   Line 27, "is," should be deleted; and
   Line 47, "where" should read --there--.

COLUMN 4
   Line 33, "layer r 14" should read --layer 14--.

COLUMN 5
   Line 23, "beam" should read --beams--.

COLUMN 6
   Line 40, "arrow" should read --an arrow.--.

COLUMN 8
   Line 15, "As" should read --An--.

COLUMN 10
   Line 38, "abovedescribed" shoud read --above-described--.

UNITED STATES PATENT AND TRADEMARK OFFICE
CERTIFICATE OF CORRECTION

PATENT NO. : 4,795,243

DATED : January 3, 1989

INVENTOR(S) : Masayuki Suzuki

It is certified that error appears in the above-identified patent and that said Letters Patent is hereby corrected as shown below:

<u>COLUMN 11</u>
    Line 65, "in" should read --is--.

<u>COLUMN 14</u>
    Line 47, "accor-" should read --in accor--.

<u>COLUMN 16</u>
    Line 18, "switching circuits 119a-199c" should read --switching circuits 119a-119c--;
    Line 30, "shown" should read --show--;
    Line 43, "numeral 312" should read --number 132--; and
    Line 52, "heats 134a and 134b" should read --heater 134a and 134b--.

<u>COLUMN 19</u>
    Line 1, "814" should read --184--; and
    Line 21, "as" should read --a--.
    Line 22, "shorted" should read --shorter--

<u>COLUMN 23</u>
    Line 19, "lett" should read --letter--;
    Line 45, "step should read --stop--.

<u>COLUMN 24</u>
    Line 34, "column" should read --columns--.

<u>COLUMN 26</u>
    Line 41, "collimeter" should read --collimater--;

UNITED STATES PATENT AND TRADEMARK OFFICE
CERTIFICATE OF CORRECTION

PATENT NO. : 4,795,243

DATED : January 3, 1989

INVENTOR(S) : Masayuki Suzuki

It is certified that error appears in the above-identified patent and that said Letters Patent is hereby corrected as shown below:

COLUMN 28
    Line 7, "or" should read --of--.

COLUMN 29
    Line 13, "is" should read --which is--;
    Line 42, "filting" should read --filtering--.

COLUMN 31
    Line 37, "ot" should read --to--; and
    Line 54, "▲." should read --1/3.--

COLUMN 32
    Line 7, "twodimensional" should read
        --two-dimensional--.

COLUMN 33
    Line 33, "o f" should read --of--; and
    Line 56, "heat-generated" should read
        --heat-generating--.

COLUMN 34
    Line 15, "752" (2nd occurrence) should read --753--.

COLUMN 36
    Line 30, "is.made" should read --is made--.

UNITED STATES PATENT AND TRADEMARK OFFICE
CERTIFICATE OF CORRECTION

PATENT NO. : 4,795,243

DATED : January 3, 1989

INVENTOR(S) : Masayuki Suzuki

It is certified that error appears in the above-identified patent and that said Letters Patent is hereby corrected as shown below:

COLUMN 37
    Line 18, "in" should read --is--; and
    Line 20, "claim 8," should read --claim 7,--; and
    Line 23, "producting" should read --producing--.

COLUMN 38
    Line 19, "non-light-tran" should read --non-light-trans--; and
    Line 37, "heating mean" should read --heating means--.

Signed and Sealed this

Twenty-ninth Day of May, 1990

Attest:

HARRY F. MANBECK, JR.

*Attesting Officer*      *Commissioner of Patents and Trademarks*